United States Patent
Kasahara et al.

(10) Patent No.: US 6,886,239 B2
(45) Date of Patent: May 3, 2005

(54) METHOD OF MAKING A THIN-FILM MAGNETIC HEAD HAVING A MAGNETORESISTIVE DEVICE

(75) Inventors: Noriaki Kasahara, Tokyo (JP); Tsuneo Kagotani, Tokyo (JP); Hitoshi Hatate, Tokyo (JP)

(73) Assignee: TDK Corporation, Tokyo (JP)

( * ) Notice: Subject to any disclaimer, the term of this patent is extended or adjusted under 35 U.S.C. 154(b) by 176 days.

(21) Appl. No.: 10/309,127

(22) Filed: Dec. 4, 2002

(65) Prior Publication Data

US 2003/0137778 A1 Jul. 24, 2003

(30) Foreign Application Priority Data

Jan. 23, 2002 (JP) ....................................... 2002-014722

(51) Int. Cl.[7] .......................... G11B 5/127; G11B 5/33; H04R 31/00
(52) U.S. Cl. ................. 29/603.13; 29/603.12; 29/603.15; 29/603.16; 29/603.18; 360/313
(58) Field of Search ..................... 29/603.12, 603.13, 29/603.15, 603.16, 603.18, 603; 360/313, 314, 122, 317, 324.2, 104; 216/49, 6, 66, 87; 430/312, 394, 396, 313, 319

(56) References Cited

U.S. PATENT DOCUMENTS

| | | | | |
|---|---|---|---|---|
| 5,095,613 A | * | 3/1992 | Hussinger et al. | ....... 29/603.17 |
| 5,228,184 A | * | 7/1993 | Kishi | ......................... 29/603.2 |
| 5,734,531 A | * | 3/1998 | Nix et al. | .................... 360/317 |
| 5,744,284 A | * | 4/1998 | Laub et al. | ................. 430/313 |
| 5,850,326 A | * | 12/1998 | Takano et al. | .............. 360/122 |
| 5,920,444 A | * | 7/1999 | Heeren et al. | ........... 360/245.2 |
| 6,187,513 B1 | * | 2/2001 | Katakura | .................... 430/312 |

FOREIGN PATENT DOCUMENTS

| | | |
|---|---|---|
| JP | A-2-276237 | 11/1990 |
| JP | A-2001-237217 | 8/2001 |

* cited by examiner

Primary Examiner—A. Dexter Tugbang
Assistant Examiner—Tai Van Nguyen
(74) Attorney, Agent, or Firm—Oliff & Berridge, PLC

(57) ABSTRACT

In the method of making a thin-film magnetic head in accordance with the present invention, an electron beam resist is irradiated with electron beams in a state where an electrically conductive member is in contact with a magnetoresistive film. Since the magnetoresistive film electrically connects individual forming positions to be formed with magnetoresistive devices, charges stored near the forming positions upon irradiation with the electron beams can be drawn to the outside by way of the electrically conductive member. As a consequence, the electron beams are less likely to lose their rectilinearity, whereby the writing precision for patterning the magnetoresistive film by electron beam lithography can be improved.

18 Claims, 27 Drawing Sheets

METHOD OF MAKING A THIN-FILM MAGNETIC HEAD HAVING A MAGNETORESISTIVE DEVICE

BACKGROUND OF THE INVENTION

1. Field of the Invention

The present invention relates to a method of making a thin-film magnetic head using a magnetoresistive device, a method of making a magnetoresistive device assembly, a method of making a head gimbal assembly, and a method of making a hard disk apparatus.

2. Related Background Art

Recently, as hard disk apparatus have been improving their surface recording density, thin-film magnetic heads playing an important role in recording/reproducing magnetic information have also been required to improve their performances. As a thin-film magnetic head, a composite thin-film magnetic head in which a reproducing head having a magnetoresistive device (MR device) and a recording head having an inductive magnetic converting device are stacked on each other has recently become mainstream in place of one carrying out both recording and reproducing by an inductive magnetic converting device. Known as MR devices are AMR (Anisotropic MagnetoResistive) devices utilizing an anisotropic magnetoresistive effect, GMR (Giant MagnetoResitive) devices utilizing a giant magnetoresistive effect, TMR (Tunnel-type MagnetoResistive) devices utilizing a magnetoresistive effect generated in a tunnel junction, and the like.

An example of demands for a reproducing head is to narrow the track width of its MR film in order to improve reading performances. Narrowing the track width of MR film makes it possible to reduce magnetic information of a hard disk having a high surface recording density. For responding to such a demand, micromachining must be realized with a high precision. Therefore, attempts have been made to utilize electron beam lithography capable of writing at a precision higher than that of photolithography which has often been used in the making of thin-film magnetic heads. The electron beam lithography uses an electron beam having a wavelength shorter than light, thereby being able to form very fine patterns.

SUMMARY OF THE INVENTION

However, the above-mentioned conventional manufacturing technique has problems as follows: For example, when patterning a TMR film, an electron beam resist is applied onto the TMR film and then is irradiated with an electron beam so as to form a resist layer. At this time, however, the electron beam resist may not be irradiated accurately with the electron beam, whereby the resist layer may not be formed into a desirable pattern. Also, unless the electron beam irradiating position is accurate, the position of reproducing track may shift or overlap with patterns formed in other layers, whereby the thin-film magnetic head may fail to function.

Such a problem may occur not only in the TMR device manufacturing process, but also in manufacturing processes utilizing electron beam lithography, i.e., processes necessitating ultra precision machining. An example of such manufacturing processes is a manufacturing step of an upper magnetic pole of a recording head equipped with an inductive magnetic converting device. Since the upper magnetic pole becomes an element defining the recording width of an MR head, it is necessary for the upper magnetic pole to have a narrow width to increase the track density. An example of the other processes employing electron beam lithography is the making of a machining monitor device known as RLG (Resistance Lapping Guide) arranged in parallel with the MR device in order to adjust the MR height.

Namely, subjects must accurately be irradiated with electron beams in the making of upper magnetic poles and processing monitor devices for MR height adjustment as well.

For overcoming the above-mentioned problems, it is an object of the present invention to provide methods of making a thin-film magnetic head, a magnetoresistive device assembly, a head gimbal assembly, and a hard disk apparatus which can realize electron beam lithography with a high writing precision.

For achieving the above-mentioned object, the inventors sought reasons why the electron beam irradiation may become inaccurate. The following reasons have been found as a result. First, a method of making a thin-film magnetic head will be explained in brief. In general, a plurality of thin-film magnetic heads are made from a single wafer-like substrate. A typical example of such a substrate is one in which, as shown in FIG. 27, an undercoat layer 102 made of an insulating material such as alumina ($Al_2O_3$), for example, is formed on a surface of a support 101 made of AlTiC ($Al_2O_3$·TiC), for example.

Subsequently laminated on the undercoat layer 102 is a lower shield layer 103 made of permalloy (NiFe), for example, for blocking unnecessary external magnetic fields. The lower shield layer 103 is formed with an appropriate gap from its adjacent lower shield layer 103. Further laminated on the lower shield layer 103 is a lower gap layer 104 made of NiCr, Au, Ta, Cu, Al, or the like, for example, which is nonmagnetic but electrically conductive.

Then, forming of a TMR film 110 on each lower gap layer 104 is started. Though not depicted, the TMR film 110 has a laminated structure having a free layer comprising Fe, Co, Ni, or the like, a tunnel barrier layer made of $Al_2O_3$ or the like allowing tunnel current to flow therethrough, a pinned layer whose direction of magnetization is constant regardless of external magnetic fields, and a pinning layer for fixing the direction of magnetization of the pinned layer. Preferably, a cap layer made of Ta, NiCr, or the like, for example, for preventing the TMR film from oxidizing is formed on the pinning layer. Thus laminated TMR film 110 is subjected to electron beam lithography in order to define a narrow track width.

FIG. 27 is a schematic view showing the process of subjecting the TMR film 110 to electron beam lithography. First, for starting the electron beam lithography, the whole surface of the substrate is coated with an electron beam resist 111. Used here is a negative type resist in which the part irradiated with electron beams remain as a resist layer. After a resist layer 112 is formed upon irradiation of the electron beam resist 111 with electron beams, the TMR film 110 is etched into a desirable pattern by ion milling or the like using the resist layer 112 as a mask.

However, the inventors have found that, when the electron beam resist 111 is irradiated with an electron beam, electric charges have already been stored in the TMR film 110 due to steps prior to the electron beam irradiation or electric charges of the electron beam are stored in the TMR film 110 irradiated therewith. Namely, since the undercoat layer 102 formed from an insulating material exists below the TMR film 110, the electric charges stored in the TMR film 110 fail to escape to the outside, thereby causing so-called charge-up.

Due to such charge-up, when irradiating the electron beam resist 111 with an electron beam, the negatively-charged electron beam incurs a repulsive force, so as to be inhibited from advancing straight as indicated by arrows in FIG. 27, whereby writing may fail to be done as aimed.

Against such a background, the inventors have accomplished the following invention. Namely, the present invention provides a method of making a thin-film magnetic head having a magnetoresistive device, the method comprising, at least, the steps of forming, on a substrate to be formed with a plurality of magnetoresistive devices at respective forming positions, a magnetoresistive film so as to connect the plurality of forming positions to each other electrically; coating one side of the magnetoresistive film with an electron beam resist; forming a resist film having a desirable pattern by irradiating the electron beam resist with an electron beam after bringing an electrically conductive member into contact with the magnetoresistive film; and forming the magnetoresistive film into a desirable pattern by using the resist film as a mask; so as to prepare a plurality of magnetoresistive devices on the substrate; and then cutting the substrate into a plurality of thin-film magnetic heads. In the step of forming a resist film having a desirable pattern, the electron beam resist may be irradiated with an electron beam while the electrically conductive member is in contact with the magnetoresistive film.

In such a method of making a thin-film magnetic head, the electron beam resist is irradiated with an electron beam after the electrically conductive member comes into contact with the magnetoresistive film. Since the magnetoresistive film electrically connects the forming positions to be formed with the magnetoresistive devices, electric charges stored near each forming position before the electron beam irradiation can be led to the outside by way of the electrically conductive member. If the electron beam resist is irradiated with an electron beam after the electrically conductive member comes into contact with the magnetoresistive film while keeping this contact state, electric charges stored near each forming position upon this irradiation can be led to the outside by way of the electrically conductive member. As a consequence, the electron beam is kept from losing its rectilinearity, whereby the writing precision for patterning the magnetoresistive film by electron beam lithography can be improved.

Preferably, in the method of making a thin-film magnetic head in accordance with the present invention, the magnetoresistive film is formed so as to cover substantially the whole surface of the substrate when carrying out the step of forming the magnetoresistive film.

In this case, it is not necessary to form the magnetoresistive film at specific positions alone, whereby the manufacturing steps can be simplified.

Preferably, in the method of making a thin-film magnetic head in accordance with the present invention, predetermined sections of the electron beam resist are successively irradiated with the electron beam, whereas the irradiation is carried out while the electrically conductive member is in contact with the magnetoresistive film when irradiating each section with the electron beam.

There are cases where the electron beam resist is irradiated with an electron beam while being divided into a plurality of sections. In such a case, if the electrically conductive member is in contact with the magnetoresistive film, electric charges stored in the magnetoresistive film can reliably be led to the outside when any section is irradiated with the electron beam.

The present invention provides a method of making a magnetoresistive device assembly equipped with a plurality of magnetoresistive devices, the method comprising the steps of forming, on a substrate to be formed with a plurality of magnetoresistive devices at respective forming positions, a magnetoresistive film so as to connect the plurality of forming positions to each other electrically; coating one side of the magnetoresistive film with an electron beam resist; forming a resist film having a desirable pattern by irradiating the electron beam resist with an electron beam after bringing an electrically conductive member into contact with the magnetoresistive film; and forming the magnetoresistive film into a desirable pattern by using the resist film as a mask. In the step of forming a resist film having a desirable pattern, the electron beam resist may be irradiated with an electron beam while the electrically conductive member is in contact with the magnetoresistive film.

In such a method of making a magnetoresistive device assembly, the electron beam resist is irradiated with an electron beam after the electrically conductive member comes into contact with the magnetoresistive film. Since the magnetoresistive film electrically connects the forming positions to be formed with the magnetoresistive devices, electric charges stored near each forming position in the steps before the electron beam irradiation can be led to the outside by way of the electrically conductive member. If the electron beam resist is irradiated with an electron beam after the electrically conductive member comes into contact with the magnetoresistive film while keeping this contact state, electric charges stored near each forming position upon this irradiation can be led to the outside by way of the electrically conductive member. As a consequence, the electron beam is kept from losing its rectilinearity, whereby the writing precision for patterning the magnetoresistive film by electron beam lithography can be improved. The magnetoresistive device assembly herein includes a wafer formed with a plurality of magnetoresistive devices, a bar obtained by dividing the wafer into bars, and the like.

Preferably, in the method of making a magnetoresistive device assembly in accordance with the present invention, the magnetoresistive film is formed so as to cover substantially the whole surface of the substrate when carrying out the step of forming the magnetoresistive film. In this case, it is not necessary to form the magnetoresistive film at specific positions alone, whereby the manufacturing steps can be simplified.

The present invention provides a method of making a head slider equipped with a thin-film magnetic head having a magnetoresistive device, the method comprising, at least, the steps of forming, on a substrate to be formed with a plurality of magnetoresistive devices at respective forming positions, a magnetoresistive film so as to connect the plurality of forming positions to each other electrically; coating one side of the magnetoresistive film with an electron beam resist; forming a resist film having a desirable pattern by irradiating the electron beam resist with an electron beam after bringing an electrically conductive member into contact with the magnetoresistive film; and forming the magnetoresistive film into a desirable pattern by using the resist film as a mask; so as to prepare a plurality of magnetoresistive devices on the substrate; and then cutting the substrate so as to form the head slider. In the step of forming a resist film having a desirable pattern, the electron beam resist may be irradiated with an electron beam while the electrically conductive member is in contact with the magnetoresistive film.

In such a method of making a head slider, the electron beam resist is irradiated with an electron beam after the electrically conductive member comes into contact with the magnetoresistive film. Since the magnetoresistive film electrically connects the forming positions to be formed with the magnetoresistive devices, electric charges stored near each forming position in the steps before the electron beam irradiation can be led to the outside by way of the electrically conductive member. If the electron beam resist is irradiated with an electron beam after the electrically conductive member comes into contact with the magnetoresistive film while keeping this contact state, electric charges stored near each forming position upon this irradiation can be led to the outside by way of the electrically conductive member. As a consequence, the electron beam is kept from losing its rectilinearity, whereby the writing precision for patterning the magnetoresistive film by electron beam lithography can be improved.

The present invention provides a method of making a head gimbal assembly equipped with a thin-film magnetic head having a magnetoresistive device, the method comprising, at least, the steps of forming, on a substrate to be formed with a plurality of magnetoresistive devices at respective forming positions, a magnetoresistive film so as to connect the plurality of forming positions to each other electrically; coating one side of the magnetoresistive film with an electron beam resist; forming a resist film having a desirable pattern by irradiating the electron beam resist with an electron beam after bringing an electrically conductive member into contact with the magnetoresistive film; and forming the magnetoresistive film into a desirable pattern by using the resist film as a mask; so as to prepare a plurality of magnetoresistive devices on the substrate; and the steps of cutting the substrate so as to yield a plurality of magnetic head sliders each having a thin-film magnetic head; and mounting the magnetic head sliders with gimbals. In the step of forming a resist film having a desirable pattern, the electron beam resist maybe irradiated with an electron beam while the electrically conductive member is in contact with the magnetoresistive film.

In the method of making a head gimbal assembly in accordance with the present invention, the electron beam resist is irradiated with an electron beam after the electrically conductive member comes into contact with the magnetoresistive film in the process of making a thin-film magnetic head. Since the magnetoresistive film electrically connects the forming positions to be formed with the magnetoresistive devices, electric charges stored near each forming position in the steps before the electron beam irradiation can be led to the outside by way of the electrically conductive member. If the electron beam resist is irradiated with an electron beam after the electrically conductive member comes into contact with the magnetoresistive film while keeping this contact state, electric charges stored near each forming position upon this irradiation can be led to the outside by way of the electrically conductive member. As a consequence, the electron beam is kept from losing its rectilinearity, whereby the writing precision for patterning the magnetoresistive film by electron beam lithography can be improved. Therefore, the head gimbal assembly manufactured by way of such a process can form tracks of the magnetoresistive film at desirable positions, while attaining a narrow track width with a high dimensional precision, thereby exhibiting higher reproducing performances for magnetic information.

The present invention provides a method of making a hard disk apparatus equipped with a thin-film magnetic head having a magnetoresistive device, the method comprising, at least, the steps of forming, on a substrate to be formed with a plurality of magnetoresistive devices at respective forming positions, a magnetoresistive film so as to connect the plurality of forming positions to each other electrically; coating one side of the magnetoresistive film with an electron beam resist; forming a resist film having a desirable pattern by irradiating the electron beam resist with an electron beam after bringing an electrically conductive member into contact with the magnetoresistive film; and forming the magnetoresistive film into a desirable pattern by using the resist film as a mask; so as to prepare a plurality of magnetoresistive devices on the substrate; and the steps of cutting the substrate so as to yield a plurality of magnetic head sliders each having a thin-film magnetic head; mounting the magnetic head sliders with gimbals so as to prepare a head gimbal assembly; and assembling the hard disk apparatus such that the magnetic head slider of the head gimbal assembly is movable above a hard disk adapted to record a magnetic signal. In the step of forming a resist film having a desirable pattern, the electron beam resist may be irradiated with an electron beam while the electrically conductive member is in contact with the magnetoresistive film.

In the method of making a hard disk apparatus in accordance with the present invention, the electron beam resist is irradiated with an electron beam after the electrically conductive member comes into contact with the magnetoresistive film in the process of making a thin-film magnetic head. Since the magnetoresistive film electrically connects the forming positions to be formed with the magnetoresistive devices, electric charges stored near each forming position due to the electron beam irradiation can be led to the outside by way of the electrically conductive member. If the electron beam resist is irradiated with an electron beam after the electrically conductive member comes into contact with the magnetoresistive film while keeping this contact state, electric charges stored near each forming position upon this irradiation can be led to the outside by way of the electrically conductive member. As a consequence, the electron beam is kept from losing its rectilinearity, whereby the writing precision for patterning the magnetoresistive film by electron beam lithography can be improved. Therefore, the hard disk apparatus manufactured by way of such a process can form tracks of the magnetoresistive film at desirable positions, while attaining a narrow track width with a high dimensional precision, thus making it possible to realize a high surface recording density.

The present invention provides another method of making a thin-film magnetic head having a magnetoresistive device, the method comprising the steps of forming a plurality of magnetoresistive devices on a substrate; and forming a plurality of processing monitor devices having an ohmic value related to an MR height of the magnetoresistive devices; the step of forming processing monitor devices including substeps of forming a resistive film to become the processing monitor devices so as to electrically connect the plurality of forming positions to be formed with the processing monitor devices; coating one side of the magnetoresistive film with an electron beam resist; forming a resist film having a desirable pattern by irradiating the electron beam resist with an electron beam after bringing an electrically conductive member into contact with the resistive film; and forming the processing monitor devices by turning the resistive film into a desirable pattern while using the resist film as a mask. In the step of forming a resist film having a desirable pattern, the electron beam resist may be irradiated with an electron beam while the electrically conductive member is in contact with the resistive film.

In this method of making a thin-film magnetic head in accordance with the present invention, the electron beam resist is irradiated with an electron beam after the electrically conductive member comes into contact with the resistive film, which will later become a constituent of processing monitor devices. Since the resistive film to become the processing monitor devices electrically connects the forming positions to be formed with the processing monitor devices, electric charges stored near each forming position due to the electron beam irradiation can be led to the outside by way of the electrically conductive member. If the electron beam resist is irradiated with an electron beam after the electrically conductive member comes into contact with the resistive film while keeping this contact state, electric charges stored near each forming position upon this irradiation can be led to the outside by way of the electrically conductive member. As a consequence, the electron beam is kept from losing its rectilinearity, whereby the writing precision in electron beam lithography for patterning the resistive film so as to form processing monitor devices can be improved.

Preferably, in the method of making a thin-film magnetic head in accordance with the present invention, the resistive film is formed so as to cover substantially the whole surface of the substrate when carrying out the step of forming the resistive film to become the processing monitor devices. In this case, it is not necessary to form the resistive film at specific positions alone, whereby the manufacturing steps can be simplified.

Preferably, in the method of making a thin-film magnetic head in accordance with the present invention, predetermined sections of the electron beam resist are successively irradiated with the electron beam, whereas the irradiation is carried out while the electrically conductive member is in contact with the resistive film when irradiating the individual sections with the electron beam. There are cases where the electron beam resist is irradiated with an electron beam while being divided into a plurality of sections. In such a case, if the electrically conductive member is in contact with the resistive film, electric charges stored in the resistive film can reliably be led to the outside when any section is irradiated with the electron beam.

The present invention provides another method of making a thin-film magnetic head having an inductive magnetic converting device for recording, the method comprising the steps of forming on a substrate a plurality of first magnetic poles and second magnetic poles magnetically connected to the first magnetic poles while holding at least a recording gap layer between the first and second magnetic poles; the step of forming second magnetic poles including the substeps of forming a magnetic film to become the second magnetic poles so as to electrically connect the plurality of forming positions to be formed with the second magnetic poles; coating one side of the magnetoresistive film with an electron beam resist; forming a resist film having a desirable pattern by irradiating the electron beam resist with an electron beam after bringing an electrically conductive member into contact with the magnetic film; and forming the magnetic film into the second magnetic poles by using the resist film as a mask. In the step of forming a resist film having a desirable pattern, the electron beam resist may be irradiated with an electron beam while the electrically conductive member is in contact with the magnetic film.

In this method of making a thin-film magnetic head in accordance with the present invention, the electron beam resist is irradiated with an electron beam after the electrically conductive member comes into contact with the magnetic film, which will later become the second magnetic poles. Since the magnetic film to become the second magnetic poles electrically connects the forming positions to be formed with the second magnetic poles, electric charges stored near each forming position due to the electron beam irradiation can be led to the outside by way of the electrically conductive member. If the electron beam resist is irradiated with an electron beam after the electrically conductive member comes into contact with the resistive film while keeping this contact state, electric charges stored near each forming position upon this irradiation can be led to the outside by way of the electrically conductive member. As a consequence, the electron beam is kept from losing its rectilinearity, whereby the writing precision in electron beam lithography for patterning the magnetic film so as to form the second magnetic poles can be improved.

Preferably, in the method of making a thin-film magnetic head in accordance with the present invention, the magnetic film is formed so as to cover substantially the whole surface of the substrate when forming the magnetic film to become the second magnetic poles. In this case, it is not necessary to form the magnetic film at specific positions alone, whereby the manufacturing steps can be simplified.

Preferably, in the method of making a thin-film magnetic head in accordance with the present invention, predetermined sections of the electron beam resist are successively irradiated with the electron beam, whereas the irradiation is carried out while the electrically conductive member is in contact with the magnetic film when irradiating the individual sections with the electron beam. There are cases where the electron beam resist is irradiated with an electron beam while being divided into a plurality of sections. In such a case, if the electrically conductive member is in contact with the magnetic film, electric charges stored in the resistive film can reliably be led to the outside when any section is irradiated with the electron beam.

The present invention provides another method of making a thin-film magnetic head having an inductive magnetic converting device for recording, the method comprising the steps of forming on a substrate a plurality of first magnetic poles and second magnetic poles magnetically connected to the first magnetic poles while holding at least a recording gap layer between the first and second magnetic poles; the step of forming second magnetic poles including the substeps of forming a plating electrode so as to electrically connect the plurality of forming positions to be formed with the second magnetic poles; coating one side of the plating electrode with an electron beam resist; forming a resist film having a desirable pattern by irradiating the electron beam resist with an electron beam after bringing an electrically conductive member into contact with the plating electrode; and forming the second magnetic poles having a desirable pattern on the plating electrode by plating while using the resist film as a mask. In the step of forming a resist film having a desirable pattern, the electron beam resist may be irradiated with an electron beam while the electrically conductive member is in contact with the plating electrode.

In this method of making a thin-film magnetic head in accordance with the present invention, the electron beam resist is irradiated with an electron beam after the electrically conductive member comes into contact with the plating electrode used for forming the second magnetic poles. Since the plating electrode electrically connects the forming positions to be formed with the second magnetic poles, electric charges stored near each forming position due to the electron beam irradiation can be led to the outside by way of the electrically conductive member. If the electron beam resist is irradiated with an electron beam after the electrically conductive member comes into contact with the plating electrode while keeping this contact state, electric charges stored near each forming position upon this irradiation can be led to the outside by way of the electrically conductive member. As a consequence, the electron beam is kept from losing its rectilinearity, whereby the writing precision in electron beam lithography for forming the second magnetic poles can be improved.

Preferably, in the method of making a thin-film magnetic head in accordance with the present invention, the plating electrode is formed so as to cover substantially the whole surface of the substrate when forming the plating electrode. In this case, it is not necessary to form the plating electrode at specific positions alone, whereby the manufacturing steps can be simplified.

BRIEF DESCRIPTION OF THE DRAWINGS

The present invention may be more readily described with reference to the accompanying drawings, in which.

DESCRIPTION OF THE PREFERRED EMBODIMENTS

In the following, preferred embodiments of the present invention will be explained in detail with reference to the accompanying drawings. Here, constituents identical to each other will be referred to with numerals identical to each other, without repeating their overlapping explanations.

First, before explaining the making methods in accordance with embodiments, outlines of the thin-film magnetic head, head gimbal assembly, and hard disk apparatus obtained by these methods will be explained with reference to FIGS. 1 to 4.

Figure 1:
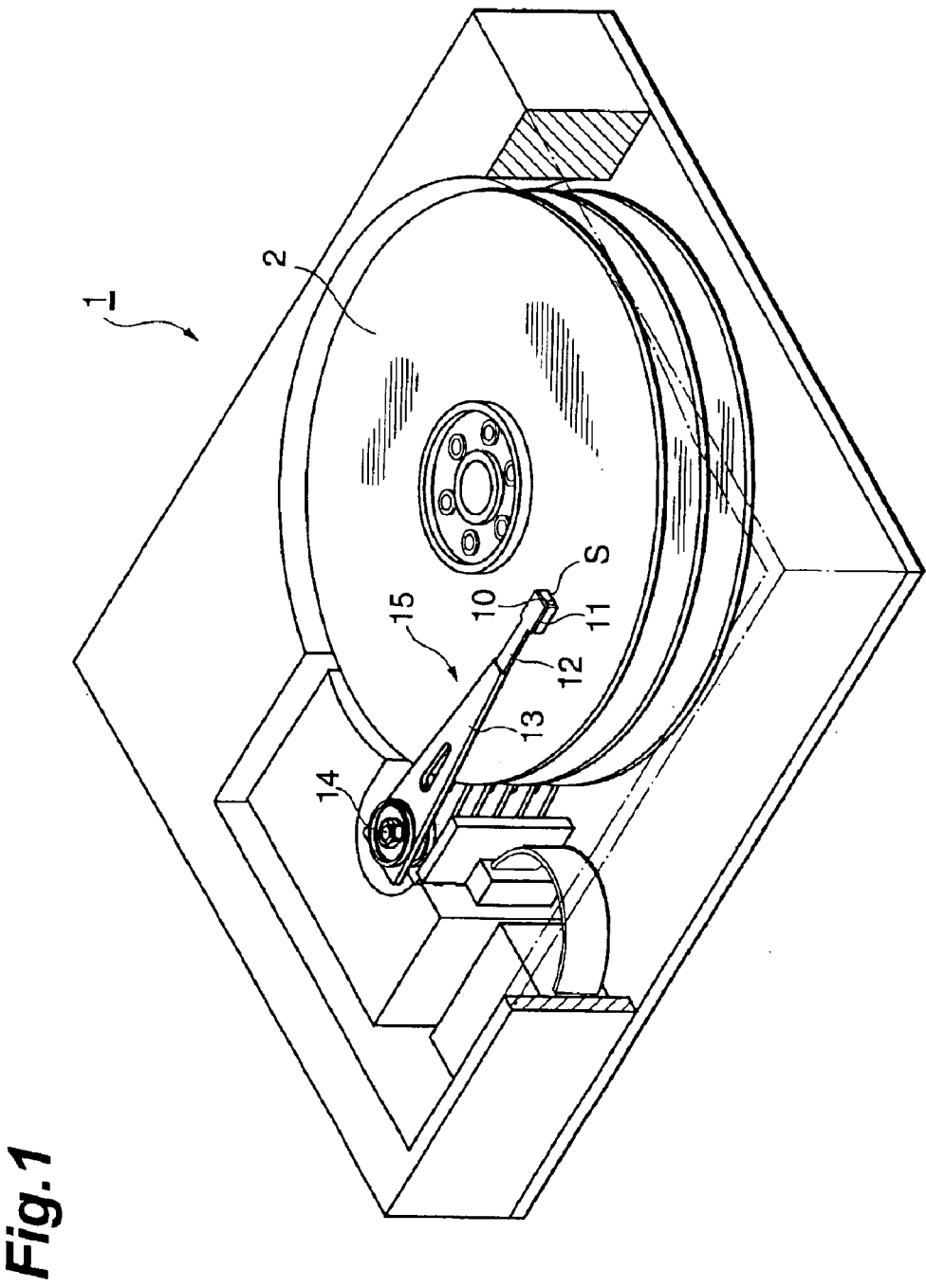
FIG. 1 is a perspective view showing an embodiment of the hard disk apparatus made by the present invention.

FIG. 1 is a view showing a hard disk apparatus comprising a thin-film magnetic head obtained by the making method in accordance with an embodiment. This hard disk apparatus 1 is one in which a thin-film magnetic head 10 records/reproduces magnetic information in a recording surface (upper face in FIG. 1) of a hard disk 2 rotating at a high speed by actuating a head gimbal assembly (HGA) 15. The head gimbal assembly 15 comprises a gimbal 12 mounted with a slider (magnetic head slider) 11 formed with the thin-film magnetic head 10, and a suspension arm 13 connected thereto, while being rotatable about a support shaft 14 by a voice coil motor, for example. As the head gimbal assembly 15 is rotated, the slider 11 moves radially of the hard disk 2, i.e., in directions traversing track lines.

Figure 2:
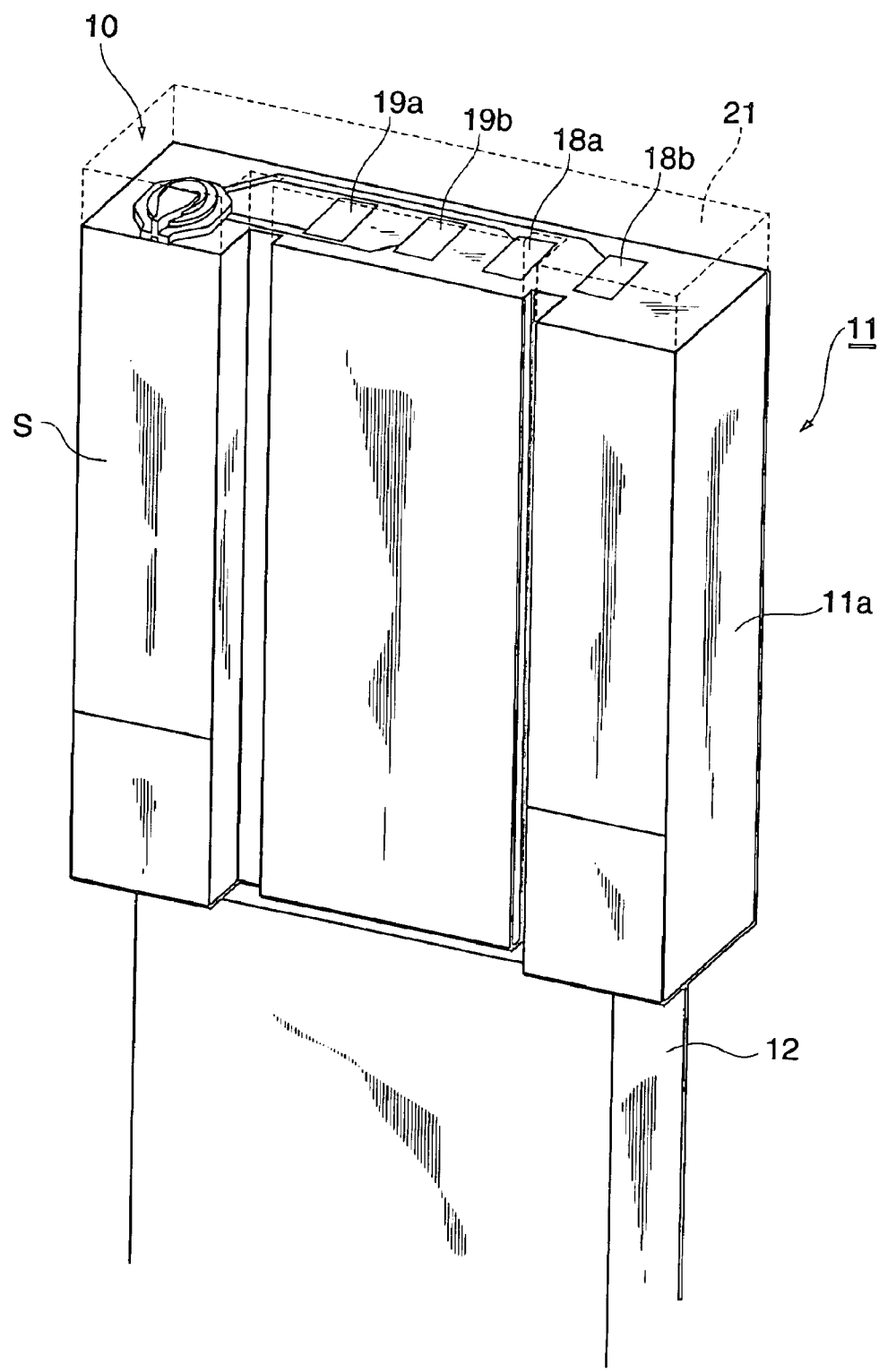
FIG. 2 is a perspective view showing a magnetic head slider.

FIG. 2 is an enlarged perspective view of the slider 11. The slider 11 has a substantially rectangular parallelepiped form, in which the thin-film magnetic head 10 is formed on a support 11a made of AlTiC ($Al_2O_3 \cdot TiC$). The front-side face in this drawing is a surface opposing the recording surface of the hard disk 2, and is referred to as an air bearing surface (ABS) S. When the hard disk 2 rotates, the slider 11 floats up due to the airflow accompanying the rotation, whereby the air bearing surface S separates from the recording surface of the hard disk 2. The thin-film magnetic head 10 is provided with recording pads 18a, 18b and reproducing pads 19a, 19b, whereas respective leads (not shown) connected to these pads for inputting/outputting electric signals are attached to the suspension arm 13 shown in FIG. 1. Also, for protecting the thin-film magnetic head 10, an overcoat layer 21 indicated by broken lines in the drawing is provided. The air bearing surface S may be coated with DLC (Diamond Like Carbon) or the like.

Figure 3:
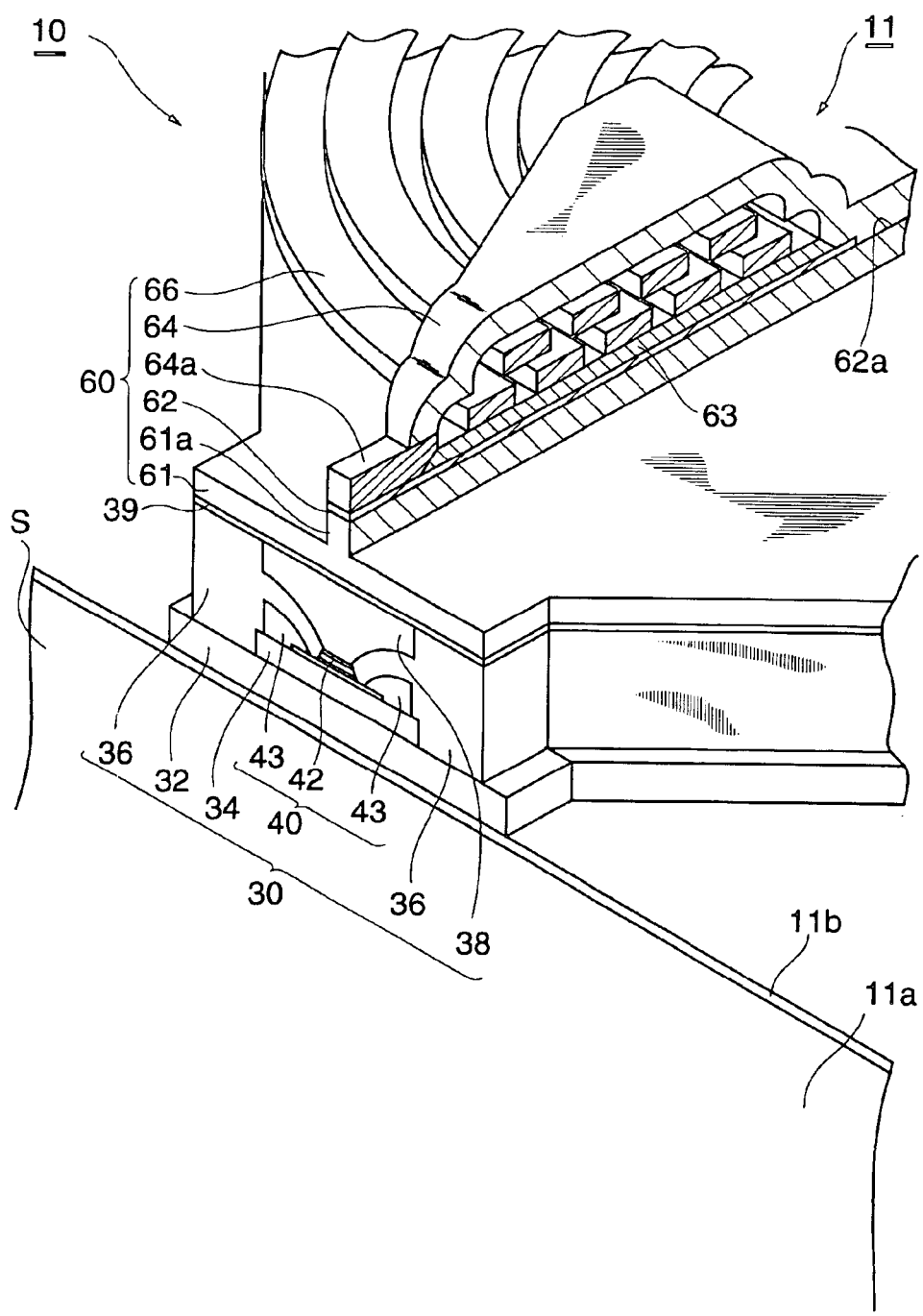
FIG. 3 is an enlarged view showing the thin-film magnetic head and its surroundings in FIG. 2.

FIG. 3 is an enlarged view schematically showing the thin-film magnetic head 10 formed in the slider 11. For explaining outlines of the thin-film magnetic head 10, it is illustrated in a partly cutaway state omitting layers which will not be mentioned. An undercoat layer 11b made of an electrically insulating material such as alumina ($Al_2O_3$) is formed on the support 11a, on which the thin-film magnetic head 10 is formed.

The thin-film magnetic head 10 is a composite thin-film magnetic head in which a reproducing head section 30 having a TMR device as a magnetoresistive device and a recording head section 60 as an inductive magnetic converting device are stacked on each other. The TMR device uses a TMR film utilizing a tunnel effect and exhibiting a magnetoresistance change ratio higher than that of a GMR film.

The reproducing head section 30 mainly comprises a lower shield layer 32 also functioning as a lower electrode, a lower gap layer 34 formed from a nonmagnetic, electrically conductive material, a TMR device 40, insulating layers 36 disposed on both sides thereof, an upper gap layer (not depicted) disposed on the TMR device 40 as appropriate, and an upper shield layer 38 also functioning as an upper electrode formed on the TMR device 40. The lower gap layer 34 is used for adjusting the read gap to a desirable value in conformity with the recording density of a recording medium. The lower shield layer 32 and upper shield layer 38 function to prevent the TMR device from detecting unnecessary external magnetic fields. The TMR device 40 comprises a TMR film 42 and magnetic bias application layers 43 made of hard magnets or the like, for example, disposed on both sides thereof. Though not depicted, the lower shield layer 32 (lower electrode) and upper shield layer 38 (upper electrode) are electrically connected to the reproducing pads 19a and 19b (see FIG. 2), respectively. In the cases where words "upper" and "lower" are used in this specification, as in the shield layers, "lower" refers to the side closer to the support 11a, whereas "upper" refers to the side farther from the support 11a.

Figure 4:
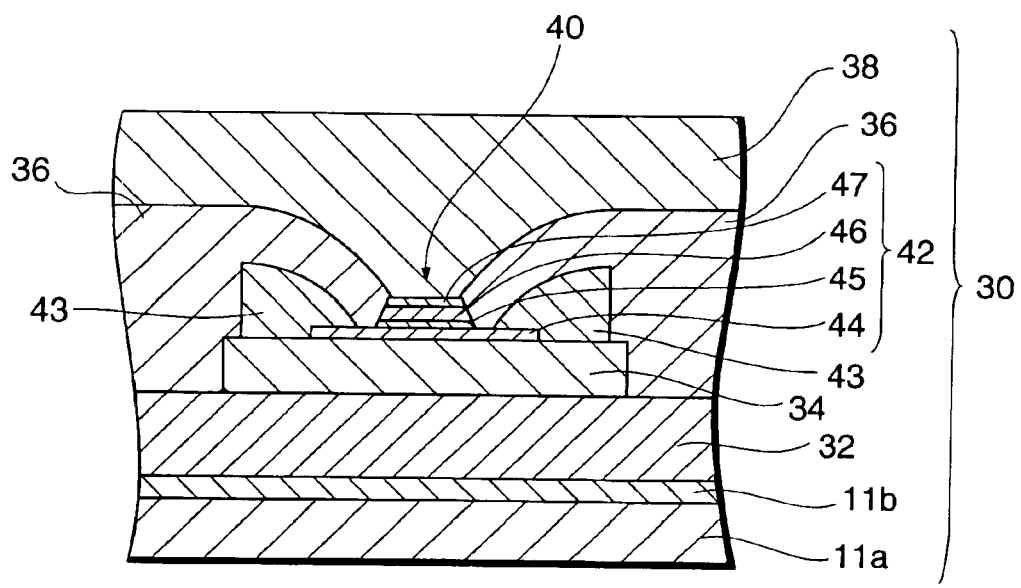
FIG. 4 is a sectional view of a TMR device and its surroundings.

FIG. 4 is a sectional view showing the TMR device 40 and its surroundings at a position vertically slightly inside the air bearing surface S. The TMR film 42 of the TMR device 40 comprises a free layer 44 containing a ferromagnet and having a direction of magnetization changeable according to external magnetic fields; a thin, nonmagnetic, insulating tunnel barrier layer 45 through which electrons can pass while keeping their spins due to a tunnel effect; a pinned layer 46 containing a ferromagnet and constantly keeping its direction of magnetization without being influenced by external magnetic fields; and a pinning layer 47 for fixing the direction of magnetization (in the depth direction of the drawing) of the pinned layer 46. Preferably, a cap layer made of Ta, NiCr, or the like, for example, for preventing the TMR film from oxidizing is formed on the pinning layer 47. The magnetic bias application layers 43 apply a bias magnetic field to the free layer 44 of the TMR film 42 in the horizontal direction in FIG. 4.

In the following manner, such a reproducing head section 30 reproduces the magnetic information recorded in the hard disk 2. Namely, when a voltage is applied to the reproducing pads 19a, 19b (see FIG. 2), electrons flow into the free layer 44 from the pinned layer 46 through the tunnel barrier layer 45, which is an insulating layer. As mentioned above, the direction of magnetization of the free layer 44 can be changed by external magnetization, i.e., magnetization of the hard disk 2. The ohmic value decreases when the pinned layer 46 and free layer 44 have respective directions of magnetization parallel to each other, and increases otherwise. Using these phenomena, the magnetic information recorded in the hard disk 2 is readout according to the relative angle of the directions of magnetization of the free layer 44 and pinned layer 46.

Referring to FIG. 3 again, the recording head section 60 of the thin-film magnetic head 10 will be explained. The recording head section 60 is disposed on the reproducing head section 30 by way of an insulating layer 39, so as to become an inductive magnetic converting device. It is not always necessary to provide the insulating layer 39. The recording head section 60 mainly comprises a lower magnetic layer 61, a lower magnetic pole (first magnetic pole) 61a formed by partly trimming the lower magnetic layer 61, a recording gap layer 62 made of an insulating material, an upper magnetic pole (second magnetic pole) 64a formed on the recording gap layer 62 and magnetically connected to the lower magnetic pole 61a (lower magnetic layer 61) by way of an upper magnetic layer 64, and a plurality of thin-film coils 66. Though the process for preparing the upper magnetic pole 64a and that for preparing the upper magnetic layer 64 are separated from each other in this embodiment, they may be prepared at once by the same process. The recording gap layer 62 is formed with an opening 62a at the center part of the thin-film coils 66. The upper magnetic pole 64a and the lower magnetic pole 61a are magnetically connected to each other through the opening 62a. The thin-film coils 66 are electrically connected to the recording pads 18a, 18b (see FIG. 2).

In the following manner, such a recording head section 60 records information into the hard disk 2. Namely, when a recording current is caused to flow through the thin-film coils 66 by way of the recording pads 18a, 18b, a magnetic field occurs between the lower magnetic pole 61a and the upper magnetic pole 64a. As a magnetic flux occurring near the recording gap layer 62 magnetizes the hard disk 2, information is recorded.

The foregoing are outlines of the thin-film magnetic head, head gimbal assembly, and hard disk apparatus obtained by the making methods in accordance with embodiments. The making methods in accordance with embodiments will now be explained with reference to FIGS. 5 to 26.

Figure 5:
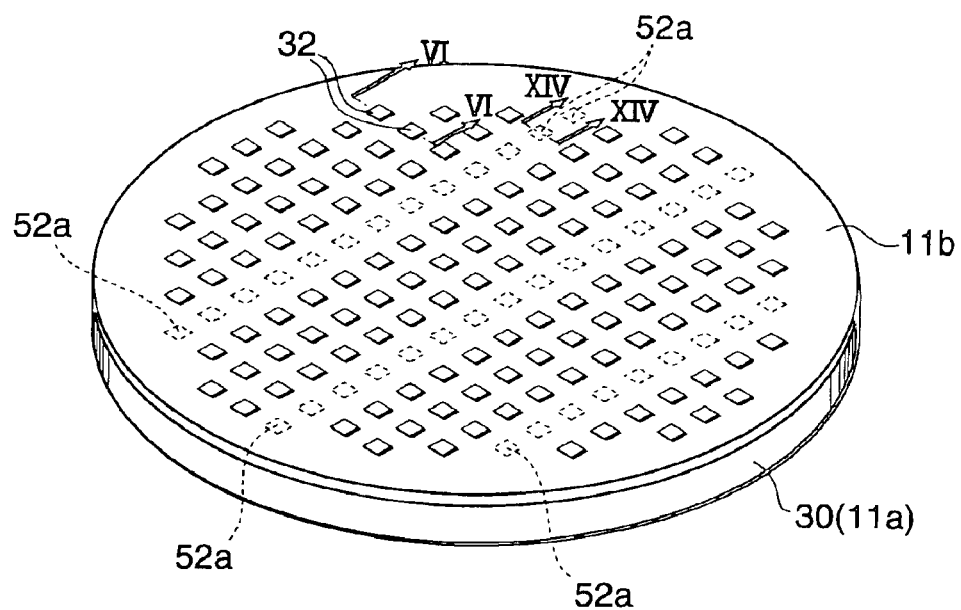
FIG. 5 is a perspective view showing a substrate formed with a plurality of lower shield layers.
Figure 6:
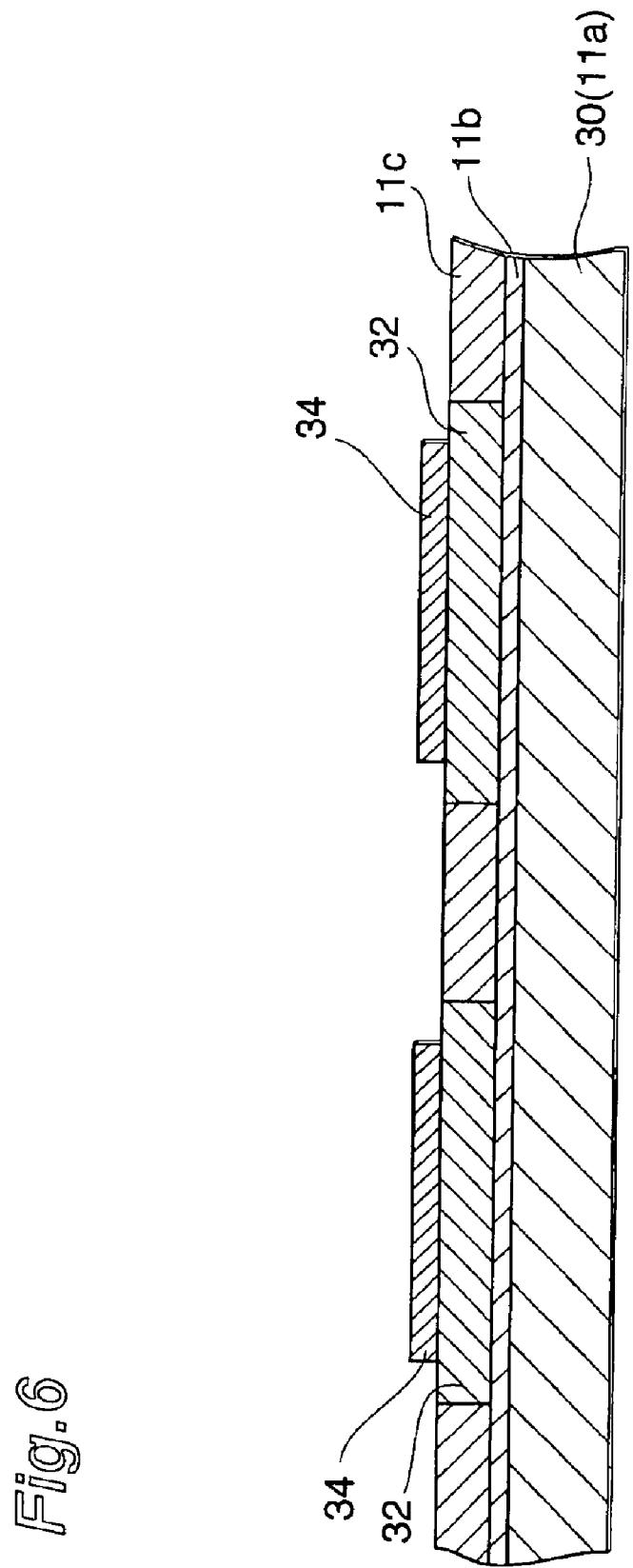
FIG. 6 is a view showing a state where a lower gap layer is formed on a lower shield layer.

The thin-film magnetic head 10 is made by the steps of preparing a part corresponding to the reproducing head section 30 and then preparing a part corresponding to the recording head section 60. First, as shown in FIG. 5, an undercoat layer 11b made of an insulating material such as alumina ($Al_2O_3$), for example, is formed by sputtering with a thickness of about 1 µm to about 10 µm on a wafer-like substrate 30 made of AlTiC ($Al_2O_3$.TiC) or the like. The substrate 30 becomes the support 11a for the slider 11 in a later step. Subsequently, lower shield layers 32 made of a magnetic material such as NiFe (Permalloy) are formed with a thickness of about 1 µm to about 3 µm on the undercoat layer 11b by plating, for example. Also, as shown in this drawing, the lower shield layers 32 are formed at matrix-like forming positions where TMR devices 40 are to be formed later. The part not formed with the lower shield layers 32 is filled with an insulating layer 11c such as alumina ($Al_2O_3$)

until its surface is substantially as high as that of the lower shield layers 32 (see FIG. 6). Regions 52a illustrated by broken lines in FIG. 5 indicate positions of processing monitor devices provided later. One processing monitor device is formed for each reproducing head or for a predetermined number of reproducing heads. The lower shield layers 32 are formed with spaces for providing the processing monitor devices.

Referring to FIG. 6, the next step will be explained. FIG. 6 is a sectional view taken along the line VI—VI of FIG. 5. By sputtering, for example, a lower gap layer 34 is formed on the lower shield layer 32 with a thickness of about 1 nm to about 70 nm. Examples of materials for forming the lower gap layer 34 include Cu, Al, Au, Ta, NiCr, and the like.

Figure 7:
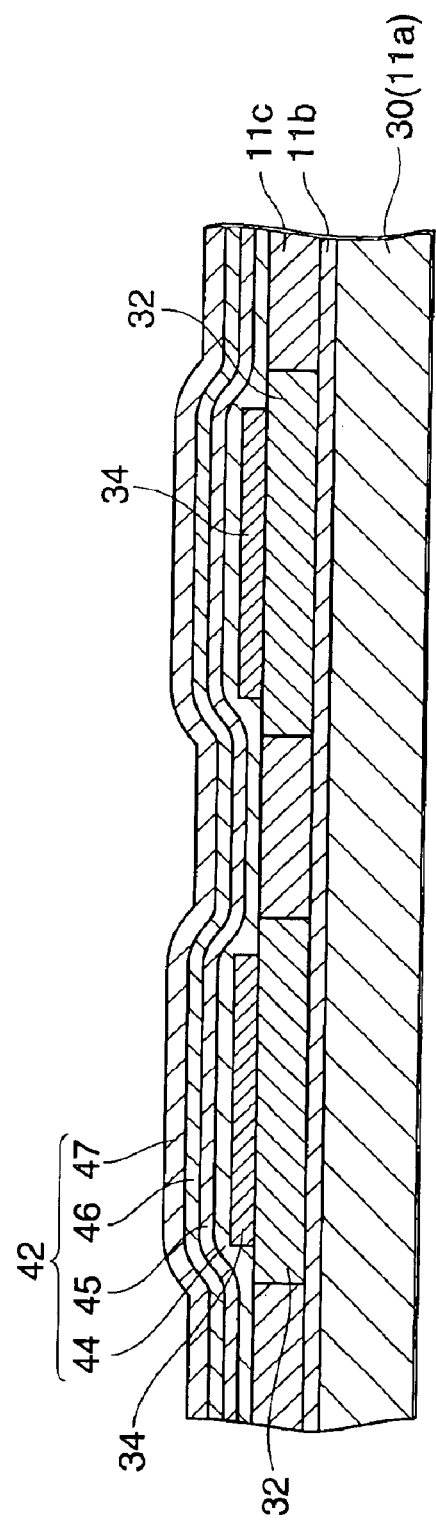
FIG. 7 is a view showing a state where a TMR film is formed on the lower gap layer.

Subsequently, as shown in FIG. 7, a TMR film 42 is formed on the lower gap layer 34. Specifically, a free layer 44, a tunnel barrier layer 45, a pinned layer 46, and a pinning layer 47 are laminated in this order by sputtering, for example. Preferably, a cap layer for preventing the TMR film 42 from oxidizing is formed on the pinning layer 47. The free layer 44 has a thickness of about 1 nm to about 10 nm and can be formed from a ferromagnetic material such as NiFe or CoFe, for example. The tunnel barrier layer 45 has a thickness of about 0.5 nm to about 2 nm and can be formed from an insulating material such as $Al_2O_3$, NiO, MgO, or $TiO_2$, for example. When forming the tunnel barrier layer 45 from $Al_2O_3$, Al may be formed on the free layer 44 and then oxidized, for example. The pinned layer 46 has a thickness of about 1 nm to about 10 nm and can be formed from a ferromagnetic material such as Fe, Co, Ni, CoFe, or the like, for example. The pinning layer 47 has a thickness of about 5 nm to about 30 nm and can be formed from an antiferromagnetic material such as PtMn, for example, which can fix the direction of magnetization of the pinned layer 46.

Figure 8:
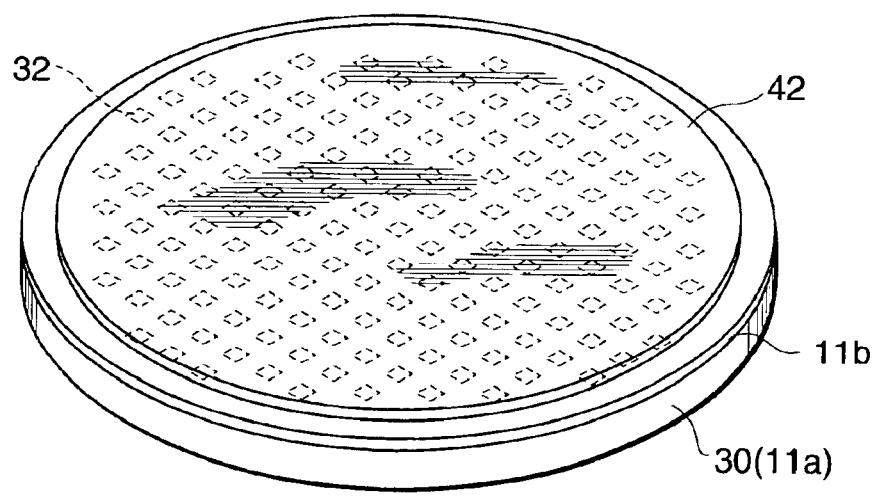
FIG. 8 is a perspective view showing a substrate in the state formed with the TMR film.

As shown in FIG. 8, the TMR film 42 is formed so as to cover substantially the whole surface of the substrate 30. Here, "substantially the whole surface of the substrate 30" encompasses the state where the whole surface of the substrate 30 is covered as a matter of course, but does not always require the TMR film 42 to spread to the peripheral part of the substrate 30. For example, it will be sufficient if the TMR 42 spreads to the forming positions (positions formed with the lower shield layers 32) located at the outermost periphery of the matrix as shown in this drawing.

Figure 9:
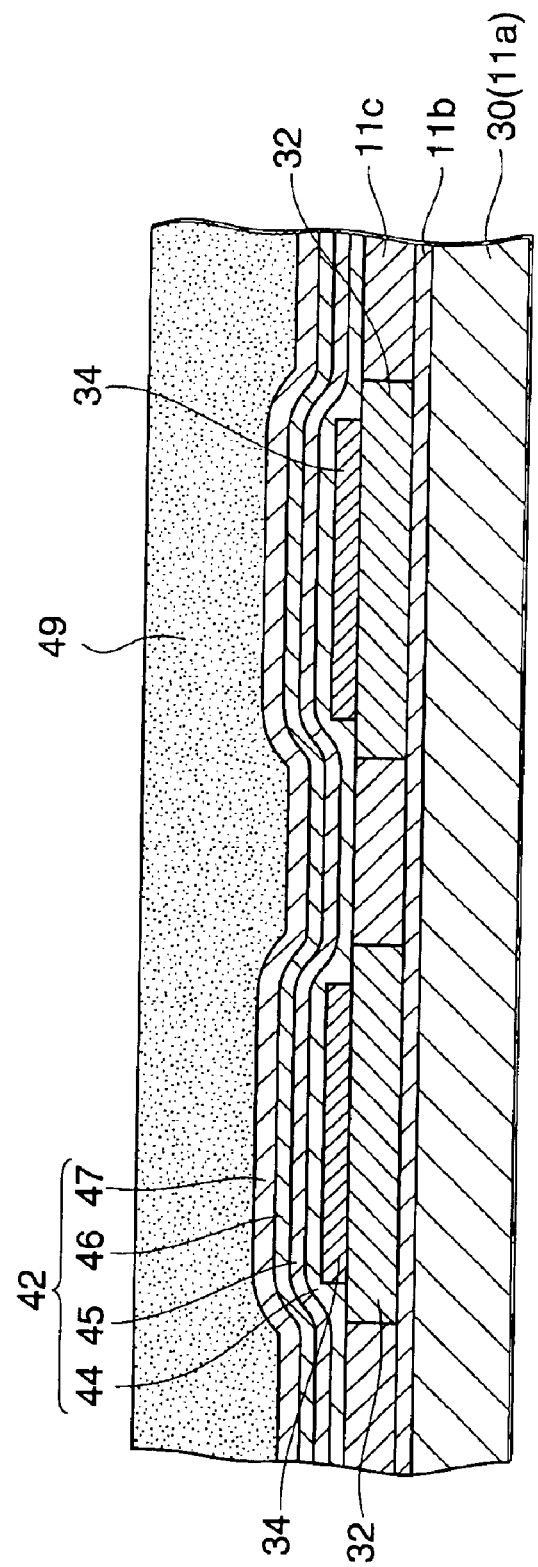
FIG. 9 is a view showing a state where an electron beam resist is applied onto the TMR film.

Subsequently, as shown in FIG. 9, an electron beam resist 49 is applied onto the TMR film 42 (on the opposite side of the substrate 30) so as to cover the whole surface of the substrate 30. Here, the electron beam resist 49 is assumed to be of negative type in which the part irradiated with an electron beam remains as a resist layer. Though a chemically amplified resist is used in this embodiment, other electron beam resists can be employed as well.

Figure 10:
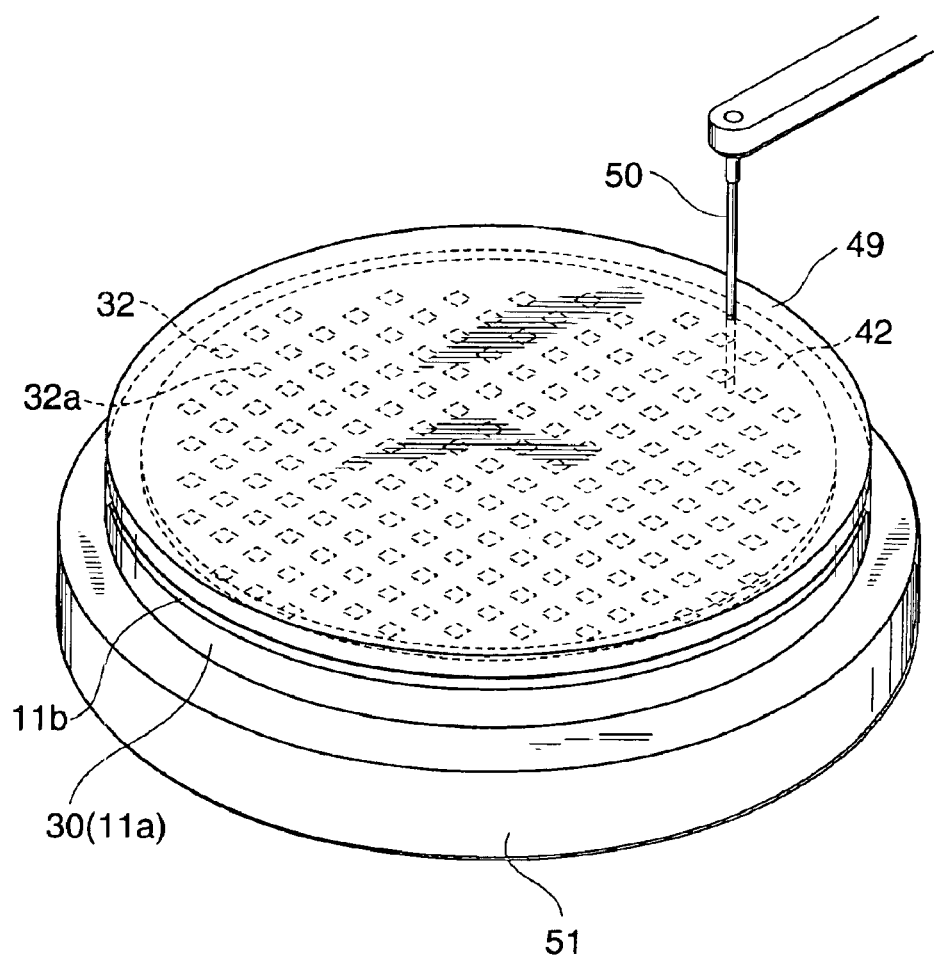
FIG. 10 is a view showing a state where an earth pin (electrically conductive member) is inserted into the TMR film before electron beam irradiation.

In this embodiment, the following step is taken prior to the electron beam irradiation. Namely, as shown in FIG. 10, a front end part of an earth pin (electrically conductive member) 50 at a ground potential, provided in an electron beam lithography apparatus and made of Cu or the like, for example, is inserted into the TMR film 42 of the substrate 30 supported by a susceptor 51. In this embodiment, the earth pin 50 is inserted near the outer periphery of the substrate 30.

Figure 11:
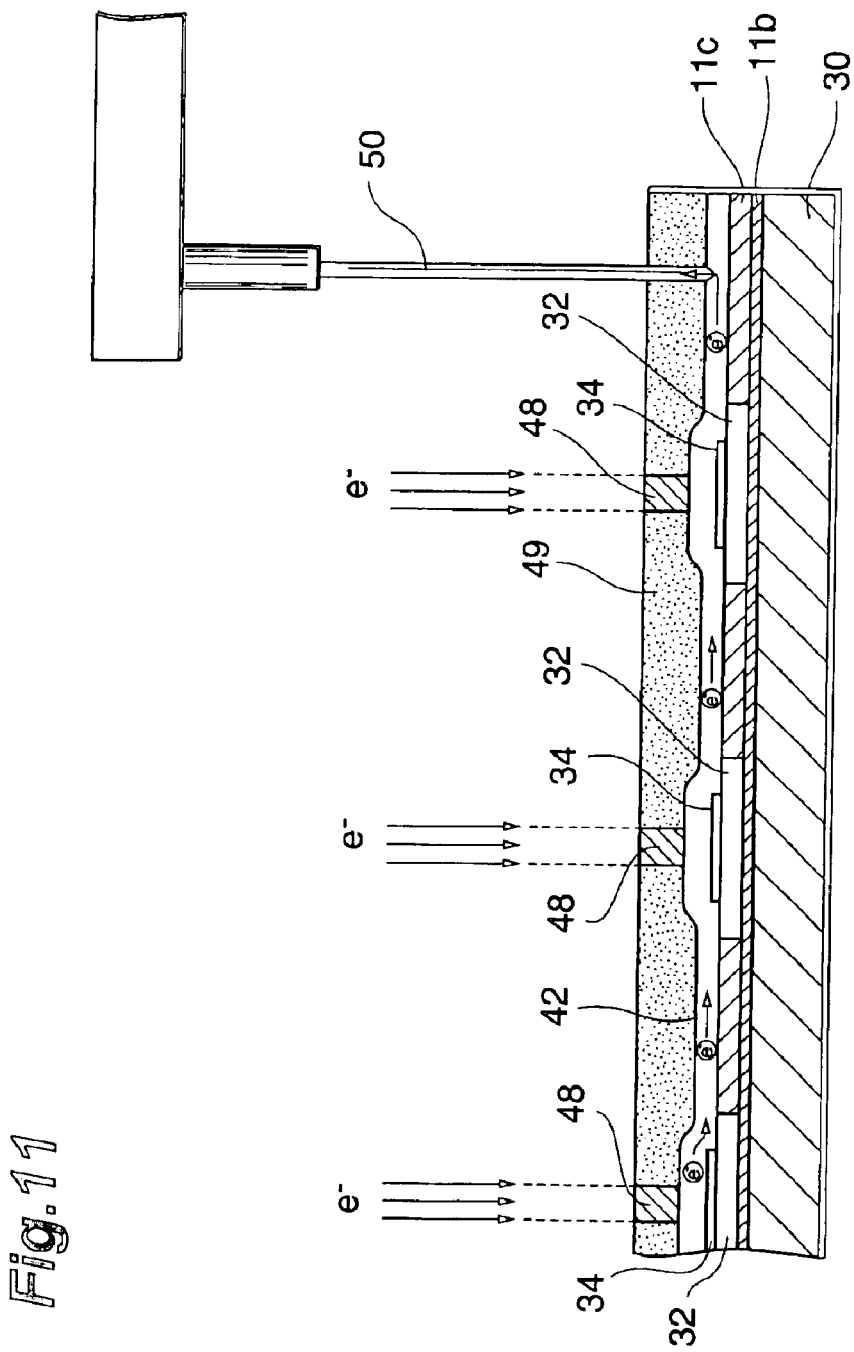
FIG. 11 is a schematic view showing how electric charges move within the TMR film at the time of electron beam irradiation.

FIG. 11 is a schematic view showing the part where the earth pin 50 is inserted and its surroundings. For convenience of explanation, the layer structure of the TMR film 42 is not depicted. When the earth pin 50 is inserted, electric charges stored in the TMR film 42 in various steps before electron beam bombardment flow out by way of the earth pin 50 as indicated by arrows in the drawing. Then, when the electron beam resist 49 is irradiated with electron beams from an electron gun (not depicted), the resist 49 cures, thereby forming a resist layer 48. Here, since the earth pin 50 is inserted in the TMR film 42, electric charges stored in the TMR film 42 at the time of electron beam irradiation move from the TMR film 42 to the outside by way of the earth pin 50 as indicated by arrows in the drawing.

Also, since the TMR film 42 is formed so as to cover substantially the whole surface of the substrate 30, substantially all the electric charges stored in the TMR film 42 can be moved to the outside. Since the electron beam irradiation can be effected in a state where no electric charges remain in the TMR film 42 as such, the electron beams can be restrained from losing their rectilinearity due to the repulsion of electric charges. As a consequence, the resist film 48 can be formed as aimed, which improves the writing precision (writing positional precision and dimensional precision), whereby the track width of the TMR film 42 can be narrowed.

The electrically conductive member for moving the electric charges of the TMR film 42 to the outside is not restricted to the needle-like earth pin 50 shown in FIGS. 10 and 11, but can be modified into various forms. For example, though a pointed electrically conductive member is suitable for making it easier to be inserted into the TMR film 42, it is not always required to be pointed. The electric charges can be moved to the outside of the TMR film 42 if the earth pin 50 is brought into contact with the surface thereof even without being inserted into the TMR film 42. Similar effects can also be obtained when the electron beam resist 49 is of positive type.

In this embodiment, when carrying out electron beam lithography, its irradiation area is divided into a plurality of sections, which are then successively irradiated with electron beams. While the earth pin 50 is in contact with the TMR film 42, each section is irradiated with the electron beams. As a consequence, the electric charges stored in the TMR film 42 can be drawn to the outside more reliably, whereby the rectilinearity of electron beams improves.

When employing such a technique drawing the electric charges of the TMR film 42 to the outside by way of the earth pin 50, it is not necessary for the TMR film 42 to cover substantially the whole surface of the substrate 30. Namely, as long as the TMR film 42 spreads so as to electrically connect individual forming positions (i.e., positions above those formed with the lower shield layers 32) where TMR devices are to be formed, the electric charges stored in the TMR film 42 at the time of electron beam irradiation move to the outside by way of the earth pin 50, whereby the rectilinearity of electron beams can be maintained. However, for simplifying the manufacturing process by saving the procedure of forming the TMR film 42 at specific positions by utilizing a mask or the like, it is preferred that the TMR film 42 covers substantially the whole surface of the substrate 30.

Though this embodiment relates to a composite type thin-film magnetic head comprising the reproducing head section 30 and recording head section 60, the rectilinearity of electron beams can also be maintained in a dedicated reproducing head not equipped with the recording head section 60 if the above-mentioned method is employed.

Figure 12:
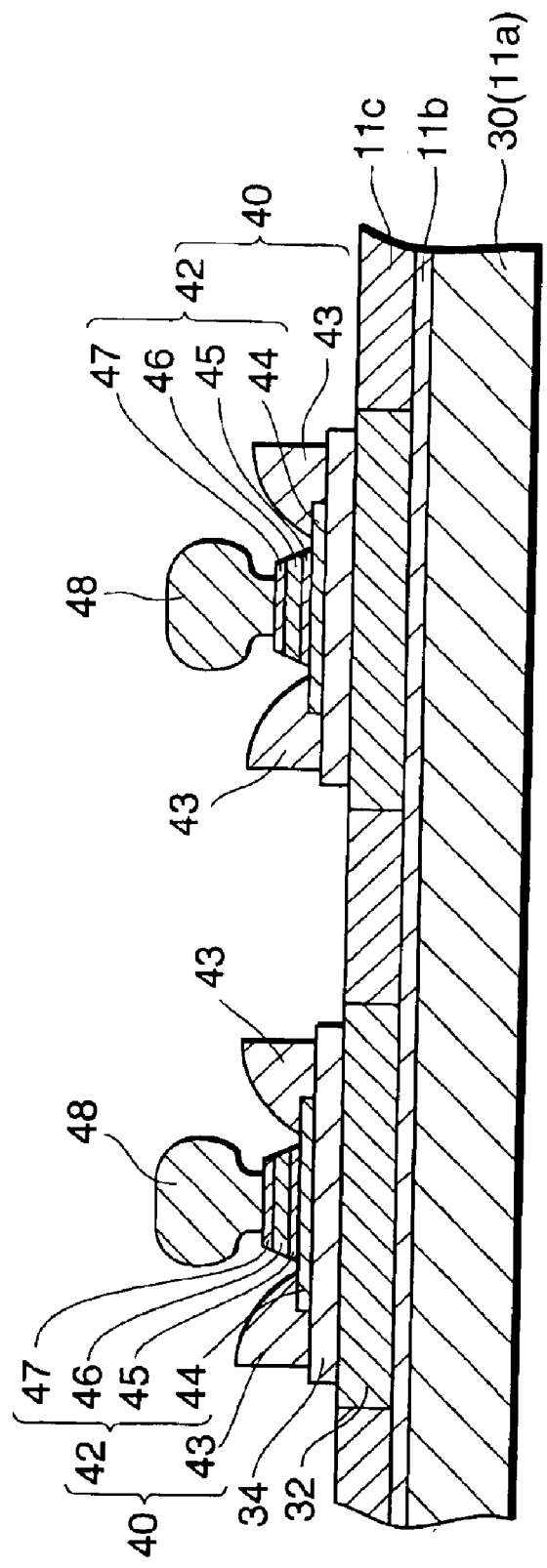
FIG. 12 is a view showing a state where magnetic bias application layers are formed on both sides of the TMR film, so as to make a TMR device.

With reference to FIG. 12, the process after the resist layer 48 is formed by electron beam irradiation will be explained. First, the uncured part of electron beam resist 49 is eliminated by washing, and then the TMR film 42 is selectively etched by ion milling or the like while using the resist layer 48 as a mask, so as to form the TMR film 42 into minute patterns. The resist layer 48 in FIG. 12 is illustrated in a form different from that of FIG. 11. Forming the resist layer 48 into an undercut structure with a depressed lower part as such facilitates liftoff which will be explained later.

Thereafter, a pair of magnetic bias application layers 43 are formed on both sides of the TMR film 42 by sputtering, for example, whereby a TMR device 40 is obtained. The magnetic bias application layers 43 are formed from a highly coercive material such as CoPt, for example.

Figure 13:
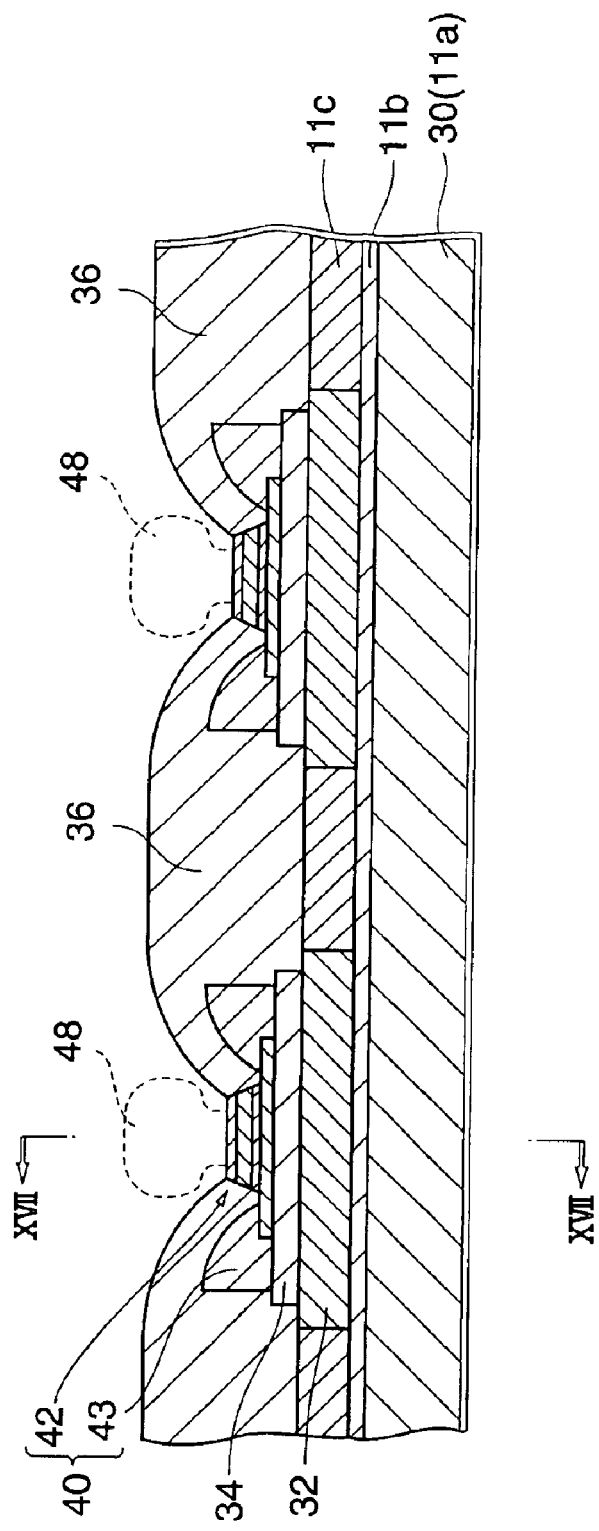
FIG. 13 is a view showing a state where liftoff is carried out after an insulating layer is formed on the magnetic bias application layers.

Subsequently, as shown in FIG. 13, an insulating layer 36 made of $Al_2O_3$ or the like is formed by sputtering, for example, so as to cover the lower shield layer 32, lower gap layer 34, and magnetic bias application layer 43. Here, the insulating layers 11c and 36 in FIGS. 3 and 4 are collectively referred to as insulating layer 36 since they are formed from the same material (alumina). Thereafter, liftoff is effected by a release liquid, so as to eliminate the resist layer 48 together with the materials laminated thereon. Further, after forming an unshown upper gap layer made of an electrically conductive material, an upper shield layer 38 is formed by plating, for example, so as to cover the TMR film 42 and insulating layer 36. An example of the material for forming the upper shield layer 38 is NiFe or the like. The state formed with the upper shield layer 38 is shown in FIG. 4. Using a known through hole forming technique or the like, the lower shield layer 32 (lower electrode) and upper shield layer 38 (upper electrode) are electrically connected to the reproducing pads 19a and 19b (see FIG. 2). The foregoing process yields a part functioning as the reproducing head 30 of the thin-film magnetic head.

Figure 14:
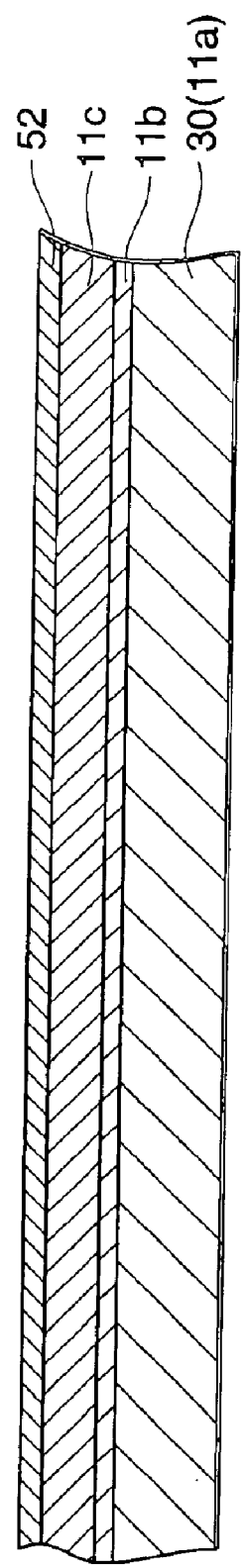
FIG. 14 is a view showing a state where a resistive film to become a part of processing monitor devices is formed on a substrate.
Figure 15:
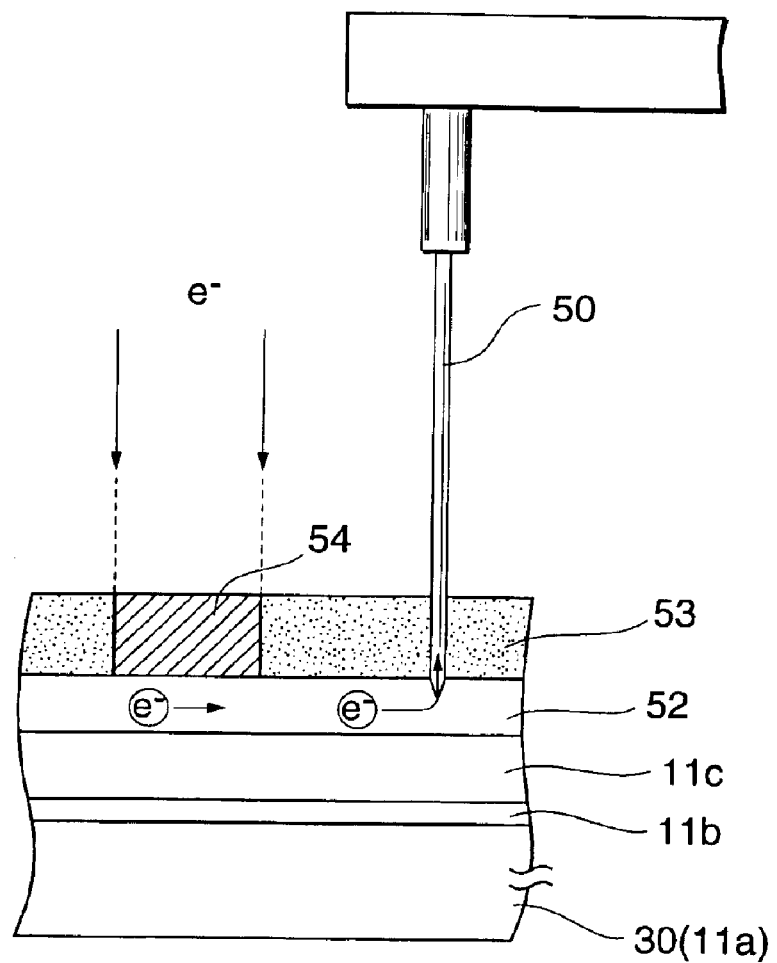
FIG. 15 is a schematic view showing how electric charges move within the resistive film at the time of electron beam irradiation.
Figure 16:
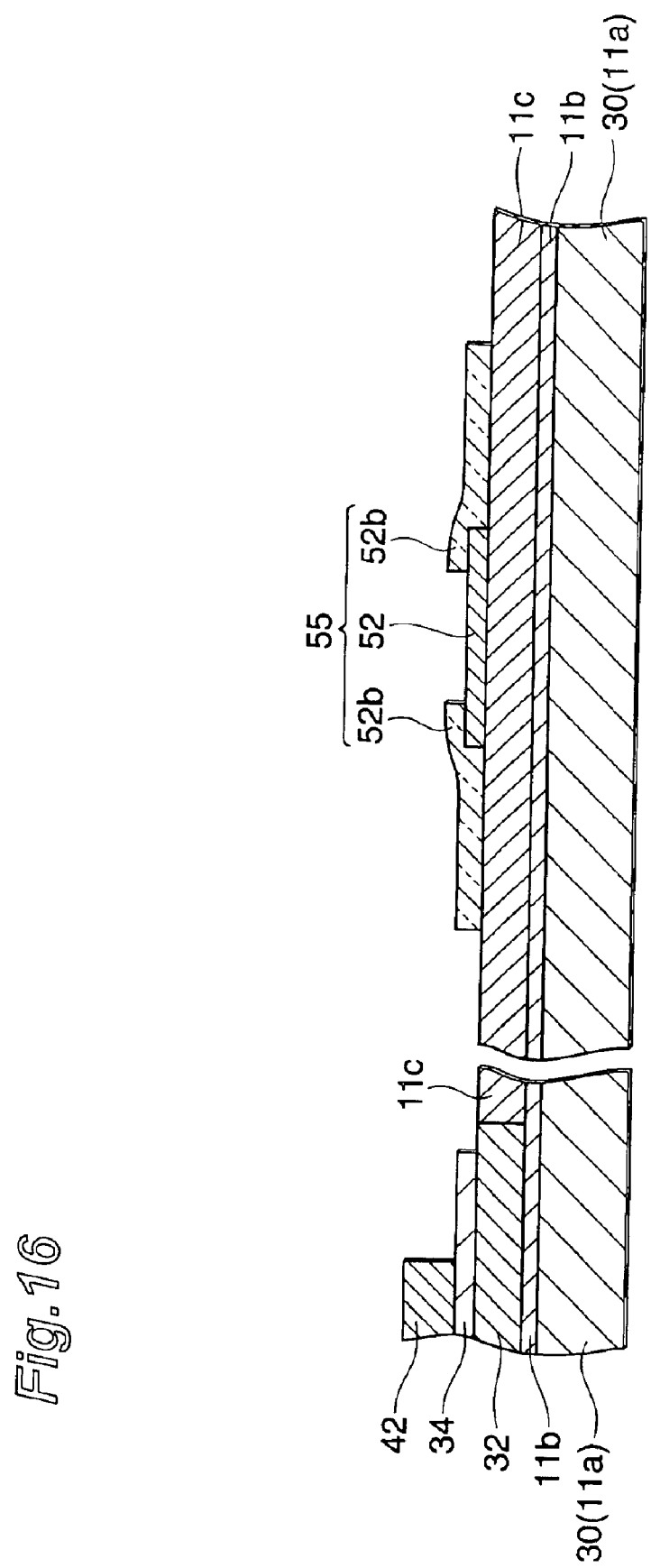
FIG. 16 is a view showing a state where leader lines are attached to a patterned resistive film, so as to make a processing monitor device.

With reference to FIGS. 14 to 16, the forming of a processing monitor device known as RLG (Resistance Lapping Guide) for adjusting the MR height of each TMR device will now be explained.

Processing monitor devices are disposed in parallel in the lower shield layer at positions corresponding to the regions 52a, for example, on the insulating layer 11c made of alumina filling the part not formed with the lower shield layers 32 in FIG. 5. Here, the MR height refers to the length in the depth direction of the TMR device as seen from the bearing surface S. The processing monitor device is also referred to as ELG (Electric Lapping Guide) sensor.

FIG. 14 shows a cross section taken along the line XIV—XIV of FIG. 5, illustrating a state where a resistive film 52 to become a part of the processing monitor device is laminated in the state of FIG. 5. As the resistive film 52, a laminated film composed of Ta/NiFe/Ta, for example, is formed with a thickness of about 20 nm to about 50 nm.

Subsequently, the whole surface is coated with an electron beam resist 53 as shown in FIG. 15. Specifically, the electron beam resist 53 is applied onto the resistive film 52 (on the side opposite from the substrate 30) so as to cover substantially the whole surface of the substrate 30. Here, the electron beam resist 53 is assumed to be of negative type in which the part irradiated with electron beams remains as a resist layer.

In this embodiment, steps similar to those at the time of patterning the TMR film 42 are carried out prior to electron beam irradiation. Namely, as schematically shown in FIG. 15, the earth pin 50 provided in the electron beam lithography apparatus is inserted into the resistive film 52 in the vicinity of the outer peripheral part of the substrate. As a consequence, electric charges stored in the resistive film 52 in various steps before electron beam bombardment flow out by way of the earth pin 50 as indicated by arrows in the drawing. Subsequently, when the electron beam resist 53 is irradiated with electron beams from an electron gun (not depicted), the resist 53 cures, thereby forming a resist layer 54. Here, since the earth pin 50 is inserted in the resistive film 52, electric charges stored in the resistive film 52 at the time of electron beam irradiation also move from the resistive film 52 to the outside through the earth pin 50 as indicated by arrows in this drawing.

Also, since the resistive film 52 is formed so as to cover substantially the whole surface of the substrate 30, substantially all the electric charges stored in the resistive film 52 can be moved to the outside. Since the electron beam irradiation can be effected in a state where no electric charges remain in the resistive film 52 as such, the electron beams can be restrained from losing their rectilinearity due to the repulsion of electric charges from the beginning of electron beam irradiation. As a consequence, the resist layer 54 can be formed as aimed, which improves the writing positional precision and dimensional precision, whereby the width of processing monitor devices can be formed accurately.

In this embodiment, when carrying out electron beam lithography, its irradiation area is divided into a plurality of sections, which are then successively irradiated with electron beams. While the earth pin 50 is in contact with the resistive film 52, each section is irradiated with the electron beams. As a consequence, the electric charges stored in the resistive film 52 can be drawn to the outside more reliably, whereby the rectilinearity of electron beams improves.

When employing such a technique drawing out the electric charges of the resistive film 52 by way of the earth pin 50, it is not necessary for the resistive film 52 to cover substantially the whole surface of the substrate 30. Namely, as long as the resistive film 52 spreads so as to electrically connect individual forming positions (i.e., positions above the regions 52a shown in FIG. 5) where processing monitor devices are to be formed, the electric charges stored in the resistive film 52 at the time of electron beam irradiation move to the outside by way of the earth pin 50, whereby the rectilinearity of electron beams can be maintained.

FIG. 16 shows a state where the unnecessary part of resistive film is eliminated by milling or the like using as a mask the resist layer 54 cured by electron beams in FIG. 15, thus leaving the resistive film 52 in a desirable pattern. Using a known technique, leader electrodes 52b are attached to thus patterned resistive film 52, whereby a processing monitor device 55 is obtained. In a subsequent step, the processing monitor device 55 is covered with an insulating material such as alumina. The foregoing is the process of manufacturing the processing monitor device.

A manufacturing process concerning the recording head section 60 will now be explained with reference to FIGS. 17 to 24. The upper magnetic pole 64a (see FIG. 3) can be prepared by any of dry scheme such as sputtering and wet scheme such as plating, which will be explained in the following.

Figure 17:
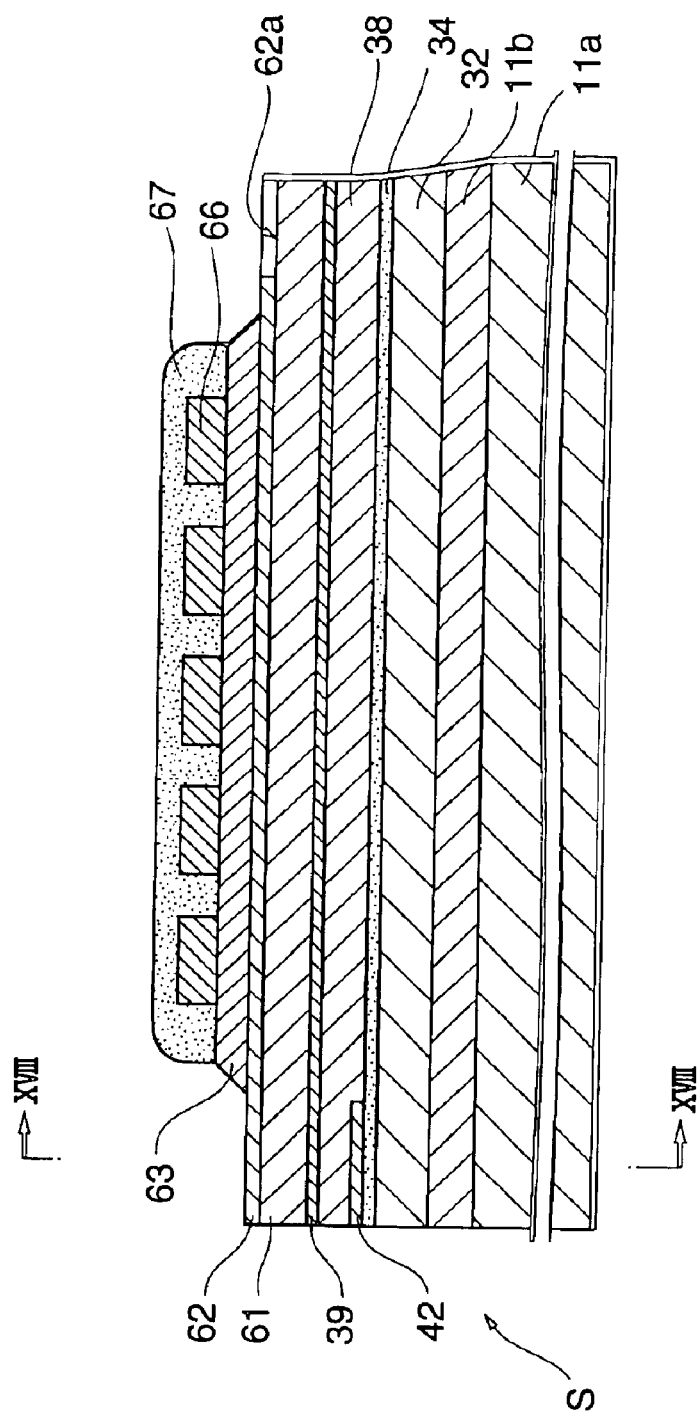
FIG. 17 is a sectional view taken along the line XVII—XVII of FIG. 13, showing the state where a recording gap layer, a thin-film coil, and the like are formed.

FIG. 17 is a sectional view taken along the line XVII—XVII of FIG. 13 after forming an upper shield layer 38 on the TMR film 42 and then taking predetermined steps. Namely, after forming the upper shield layer 38 into the state of FIG. 13, an insulating layer 39 made of an insulating material such as $Al_2O_3$ is formed thereon with a thickness of about 0.1 μm to about 0.5 μm by sputtering, for example. Subsequently, a lower magnetic layer 61 including a part which later becomes the lower magnetic pole 61a (see FIG. 3) of the recording head section 60 is formed on the insulating layer 39. As mentioned above, it is not always necessary to provide the insulating layer 39. Further, on the lower magnetic layer 61, a recording gap layer 62 formed from an insulating material such as $Al_2O_3$ is formed with a thickness of about 0.05 μm to about 0.5 μm by sputtering, for example. At this stage, the recording gap layer 62 and the upper part of lower magnetic layer 61 are not formed into a narrow pattern as shown in FIG. 3, whereby the lower magnetic pole 61a is not formed. The width of the upper shield layer 38 as seen from the air bearing surface S is on a par with that of the lower shield layer 32, whereby an insulating layer is disposed between the respective upper shield layers 38 of reproducing head sections neighboring each other (see FIG. 18).

On the recording gap layer 62, a photoresist layer 63 is formed into a predetermined pattern with a thickness of about 1.0 μm to about 2.0 μm. Then, after forming a thin-film coil 66 with a thickness of about 1 μm to about 3 μm on the photoresist layer 63, a photoresist layer 67 is formed on the thin-film coil 66. The recording pads 18a, 18b (see FIG. 2) are electrically connected to the thin-film coil 66 by a known method. In the state of FIG. 17, only one layer of thin-film coil 66 is formed. This embodiment takes a procedure in which the upper magnetic pole 64a is formed after making the first layer of thin-film coil 66, then a second layer of thin-film 66 (see FIG. 3) is formed, and thereafter the recording gap layer 62 is etched at a position corresponding to the center part of the thin-film coils 66, so as to form an opening 62a, before forming an upper magnetic layer 64 which becomes the rear end part of the upper magnetic pole. Though two stages of thin-film coils 66 and photoresist layers 67 are laminated in this embodiment as such, the number of stages and forming procedure are not restricted thereto.

Figure 18:
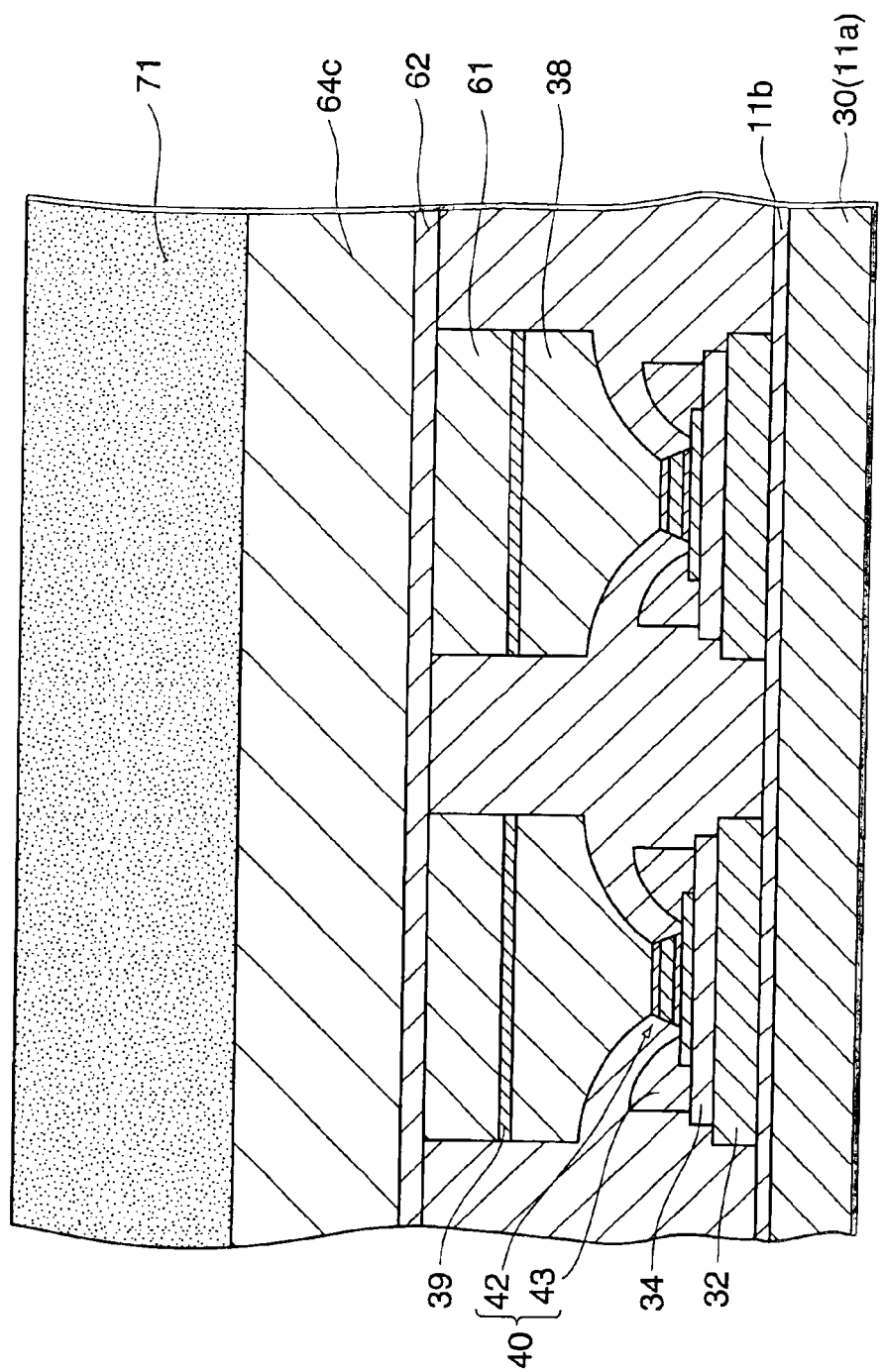
FIG. 18 is a view showing a step of a manufacturing process for making an upper magnetic pole in a dry scheme, illustrating a state where an electron beam resist is formed on a magnetic film.

A procedure of forming the upper magnetic pole by a dry scheme will now be explained. FIG. 18 is a sectional view taken along the line XVIII—XVIII of FIG. 17. First, a magnetic film 64c which will become an upper magnetic pole 64a in a later step is formed with a thickness of about 3 μm on the recording gap layer 62 by sputtering, for example. The magnetic film 64c is formed from a magnetic material such as NiFe having a highly saturated magnetic flux density, for example. Subsequently, an electron beam resist 71 is applied onto the magnetic film 64c (on the side opposite from the substrate 30) so as to cover substantially the whole surface of the substrate 30. Here, the electron beam resist 71 is assumed to be of negative type in which the part irradiated with electron beams remains as a resist layer.

Figure 19:
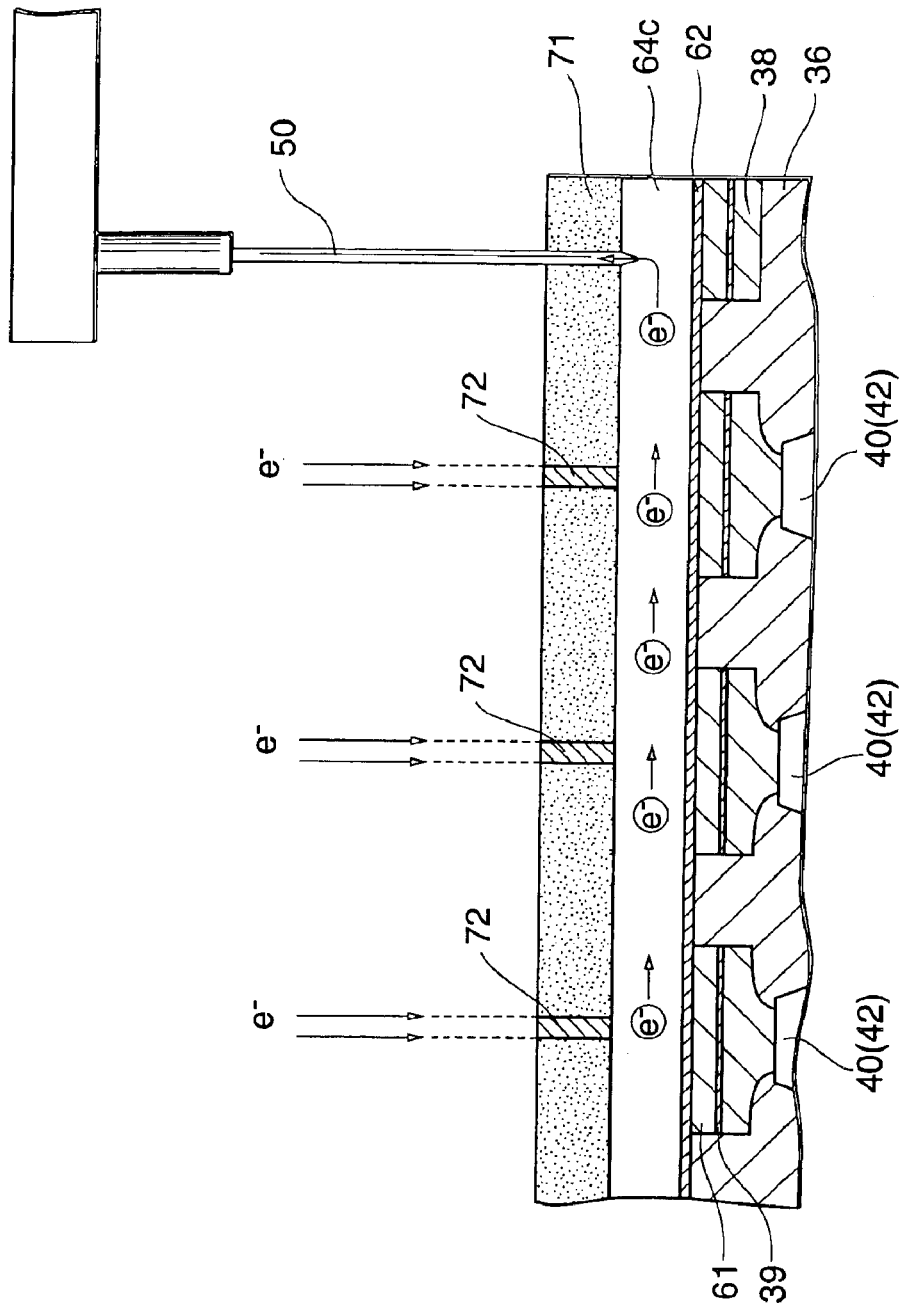
FIG. 19 is a schematic view showing how electric charges move within the magnetic film at the time of electron beam irradiation.

In this embodiment, steps similar to those at the time of patterning the TMR film 42 are carried out prior to electron beam irradiation. Namely, as schematically shown in FIG. 19, the earth pin 50 provided in the electron beam lithography apparatus is inserted into the magnetic film 64c in the vicinity of the outer peripheral part of the substrate. As a consequence, electric charges stored in the resistive film 64c in various steps before electron beam bombardment flow out by way of the earth pin 50 as indicated by arrows in the drawing. Subsequently, when the electron beam resist 71 is irradiated with electron beams from an electron gun (not depicted), the resist 71 cures, thereby forming a resist layer 72. Here, since the earth pin 50 is inserted in the magnetic film 64c, electric charges stored in the magnetic film 64c at the time of electron beam irradiation also move from the magnetic film 64c to the outside through the earth pin 50 as indicated by arrows in this drawing.

Also, since the magnetic film 64c is formed so as to cover substantially the whole surface of the substrate 30, substantially all the electric charges stored in the magnetic film 64c can be moved to the outside. Since the electron beam irradiation can be effected in a state where no electric charges remain in the magnetic film 64c as such, the electron beams can be restrained from losing their rectilinearity due to the repulsion of electric charges. As a consequence, the resist film 72 can be formed as aimed, which improves the writing precision for patterning the magnetic film 64c, whereby the track width of a recording head can be narrowed.

In this embodiment, when carrying out electron beam lithography, its irradiation area is divided into a plurality of sections, which are then successively irradiated with electron beams. After the earth pin 50 is brought into contact with the magnetic film 64c, each section is irradiated with the electron beams. As a consequence, the electric charges stored in the magnetic film 64c can be drawn to the outside more reliably, whereby the rectilinearity of electron beams improves.

When employing such a technique drawing out the electric charges of the magnetic film 64c by way of the earth pin 50, it is not necessary for the magnetic film 64c to cover substantially the whole surface of the substrate 30. Namely, as long as the magnetic film 64c spreads so as to electrically connect individual forming positions (i.e., positions above those formed with the TMR devices 40) where the upper magnetic poles 64c are to be formed, the electric charges stored in the magnetic film 64c at the time of electron beam irradiation move to the outside by way of the earth pin 50, whereby the rectilinearity of electron beams can be maintained.

Though this embodiment relates to a composite type thin-film magnetic head comprising the reproducing head section 30 and recording head section 60, the rectilinearity of electron beams can also be maintained in a dedicated recording head not equipped with the reproducing head section 30 if the above-mentioned method is employed.

After forming the resist layer 72, the uncured part of electron beam resist 71 is eliminated by washing, and the magnetic film 64c is selectively etched by ion milling or the like, for example, while using the resist layer 72 as a mask, so as to form an upper magnetic pole 64c in a desirable narrow pattern.

Figure 20:
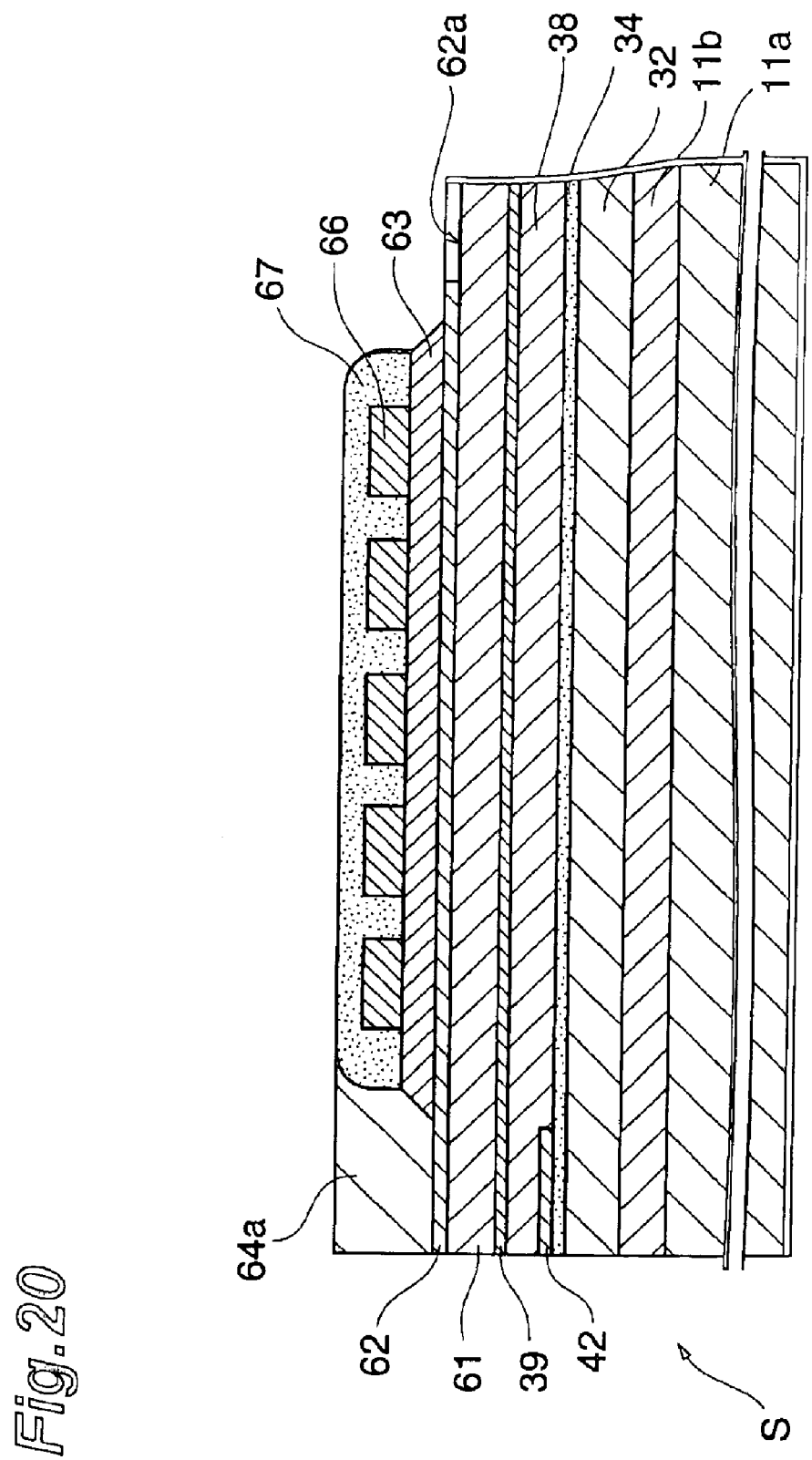
FIG. 20 is a view showing a state where the magnetic film is formed into an upper magnetic pole.

FIG. 20 shows a state where the upper magnetic pole 64a is formed (as depicted in the same direction as that of FIG. 17). Though the surface of the first photoresist layer 67 and that of the upper magnetic pole 64a are at substantially the same height, it is not always necessary for them to be formed as such. Subsequently, the second stage of thin-film coil 66 is formed, and the upper magnetic layer 64 (see FIGS. 3 and 22), which is the rear end part of the magnetic pole, is made so as to form a core through the opening 62a.

Figure 21:
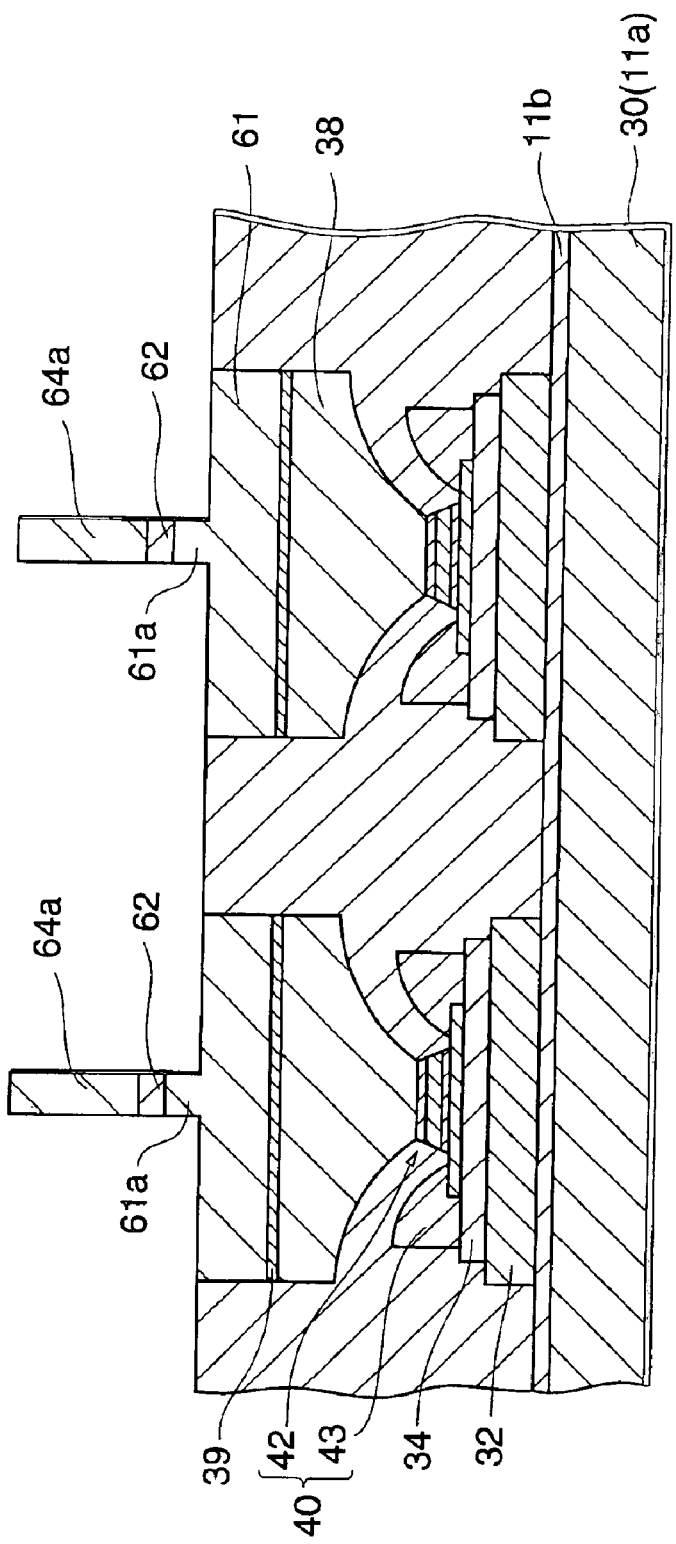
FIG. 21 is a view showing a state where the upper magnetic pole is narrowed by trimming.

Then, as shown in FIG. 21, trimming is carried out for further narrowing the upper magnetic pole 64a, while the recording gap layer 62 and the upper part of lower magnetic layer 61 are selectively etched at the same time.

Figure 22:
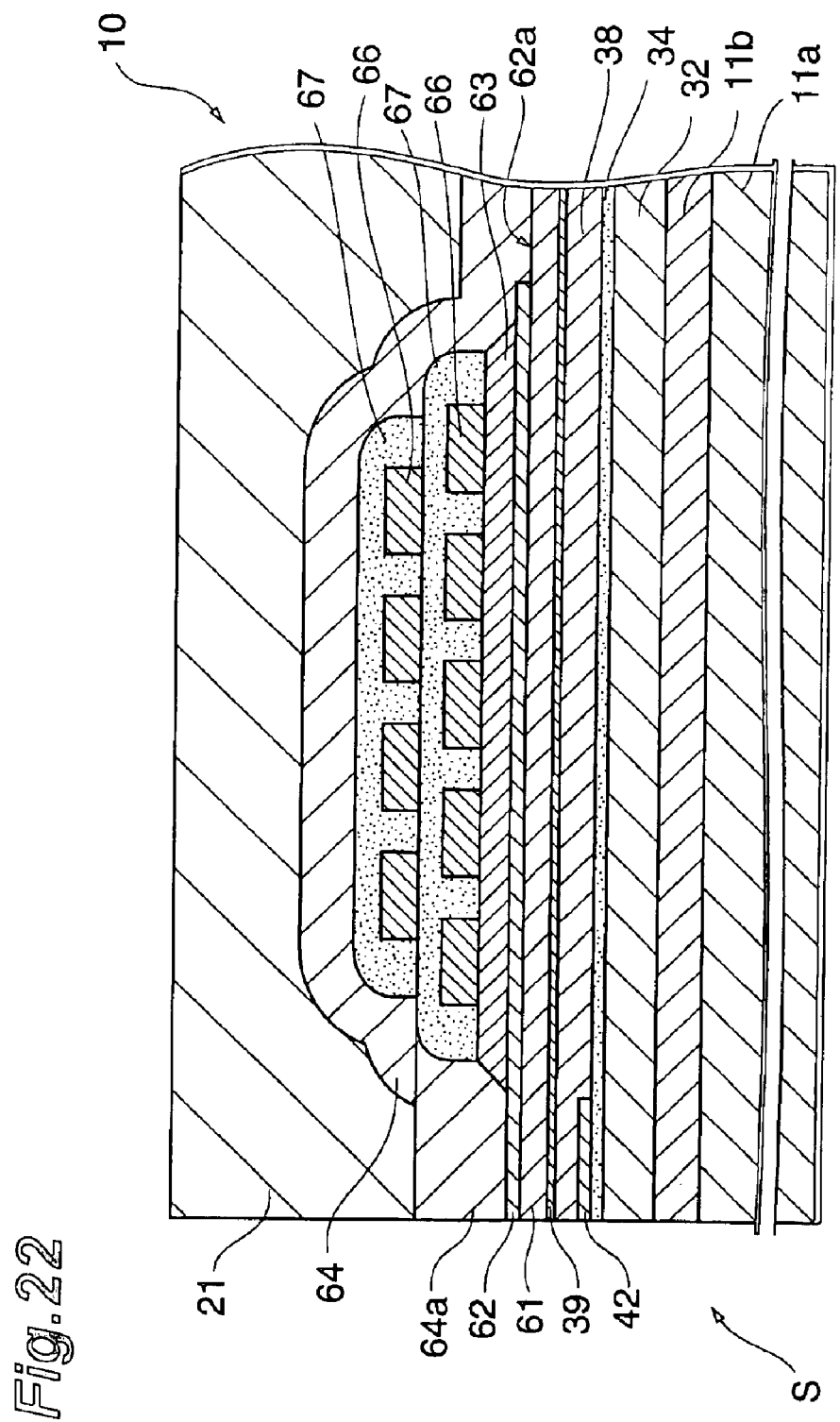
FIG. 22 is a sectional view showing a state where an overcoat layer is formed.

Subsequently, as shown in FIG. 22, an overcoat layer 21 made of an insulating material such as $Al_2O_3$ is formed on the upper magnetic pole 64 with a thickness of about 20 μm to about 30 μm by sputtering, for example. The foregoing is a manufacturing process for the part corresponding to the recording head section 60 using a dry scheme for preparing the upper magnetic pole 64a.

A process of preparing the upper magnetic pole 64a in a wet scheme will now be explained with reference to FIGS.

Figure 23:
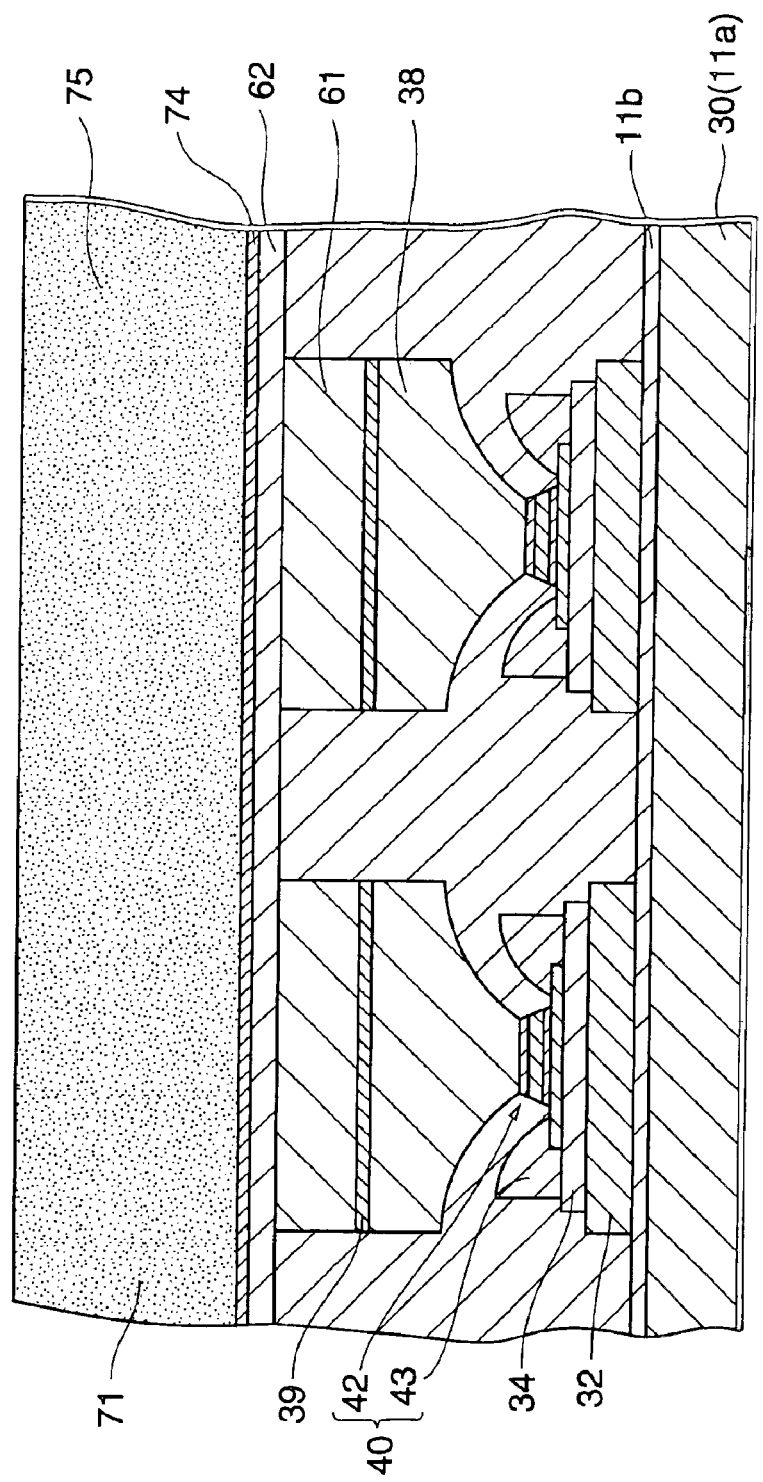
FIG. 23 is a view showing a step of a manufacturing process for making an upper magnetic pole in a wet scheme, illustrating a state where a plating electrode is formed on a recording gap layer and then is coated with an electron beam resist.

23 and 24. In this process, the upper magnetic pole 64a is formed by plating in the state shown in FIG. 17, i.e., in the state where the photoresist layer 63, thin-film coil 66, and photoresist layer 67 are formed on the recording gap layer 62. FIG. 23 is a sectional view in the same direction as FIG. 18, illustrating a state where a plating electrode 74 such as Ti/NiFe is formed on the recording gap layer 62 so as to cover substantially the whole surface of the substrate 30, and is coated with an electron beam resist 75. Here, the electron beam resist 75 is assumed to be of positive type in which the part irradiated with electron beams can be eliminated, so as to leave the part not irradiated therewith as a resist layer.

Figure 24:
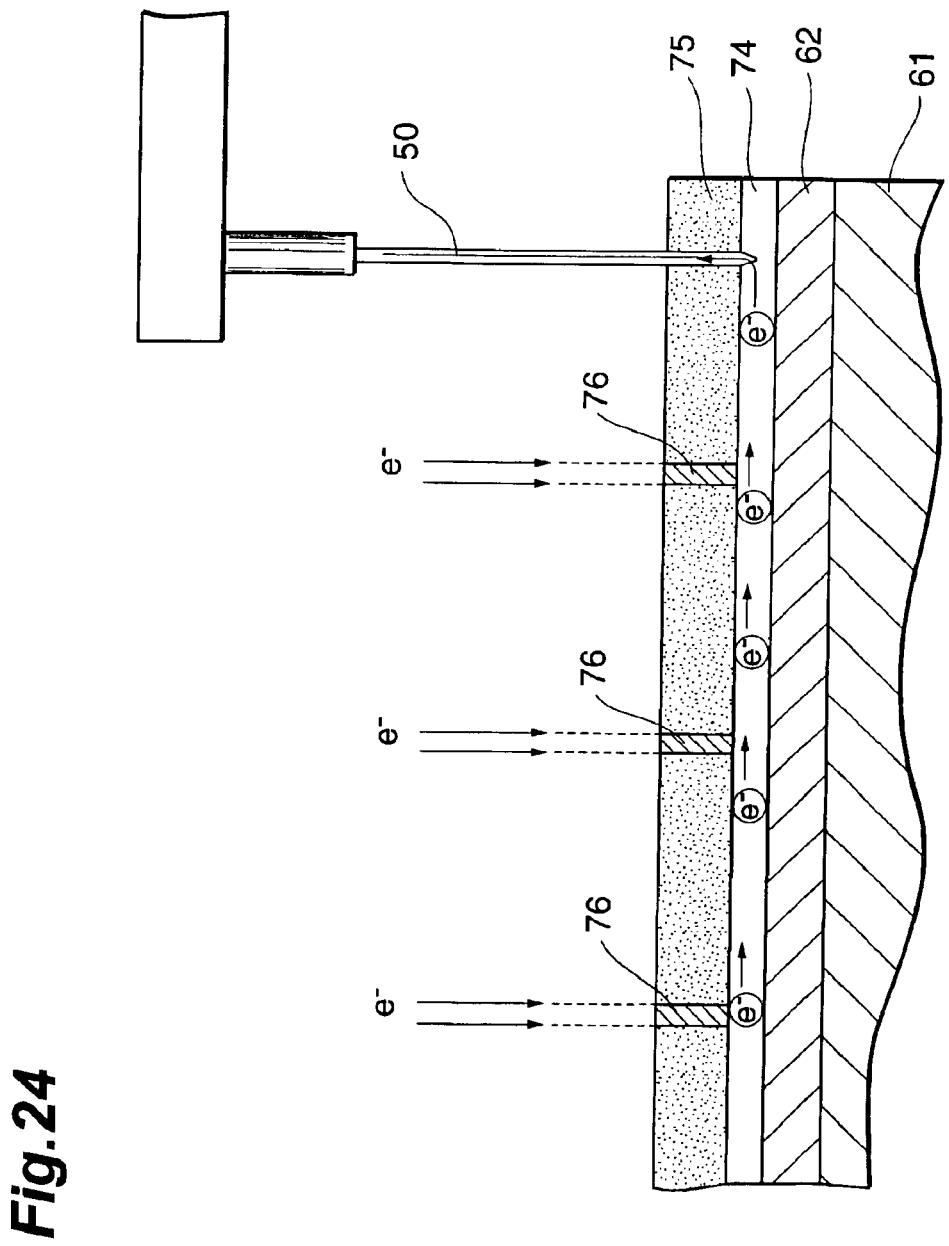
FIG. 24 is a schematic view showing how electric charges move within the plating electrode at the time of electron beam irradiation.

In this embodiment, steps similar to those in the above-mentioned case forming the upper magnetic pole in the dry scheme are carried out. Namely, as schematically shown in FIG. 24, the earth pin 50 provided in the electron beam lithography apparatus is inserted into the plating electrode 74 in the vicinity of the outer peripheral part of the substrate. As a consequence, electric charges stored in the plating electrode 74 in various steps before electron beam bombardment flow out by way of the earth pin 50 as indicated by arrows in the drawing. Subsequently, when the electron beam resist 74 is irradiated with electron beams from an electron gun (not depicted), thus irradiated part 76 of the resist 74 changes a property thereof, so as to dissolve in a solvent after baking, thereby leaving the part not irradiated with electron beams as a positive resist layer. Here, since the earth pin 50 is inserted in the plating electrode 74, electric charges stored in the plating electrode 74 at the time of electron beam irradiation also move from the plating electrode 74 to the outside through the earth pin 50 as indicated by arrows in this drawing.

Also, since the plating electrode 74 is formed so as to cover substantially the whole surface of the substrate 30, substantially all the electric charges stored in the plating electrode 74 can be moved to the outside. Since the electron beam irradiation can be effected in a state where no electric charges remain in the plating electrode 74 as such, the electron beams can be restrained from losing their rectilinearity due to the repulsion of electric charges. As a consequence, the part 76 irradiated with electron beams can be formed as aimed, which improves the precision at which the upper magnetic pole 64a is formed by plating in the subsequent step, whereby the track width of the recording head section 60 can be narrowed.

In this embodiment, when carrying out electron beam lithography, its irradiation area is divided into a plurality of sections, which are then successively irradiated with electron beams. Each section is irradiated with the electron beams after the earth pin 50 is brought into contact with the plating electrode 74. As a consequence, the electric charges stored in the plating electrode 74 can be drawn to the outside more reliably, whereby the rectilinearity of electron beams improves.

After eliminating the electron-beam-irradiated part 76 with a solvent, plating is carried out while using as a mask the part of resist layer not irradiated with electron beams, so as to form the upper magnetic pole 64a in a desirable narrow pattern on the plating electrode 74 (see FIG. 20).

Thereafter, as in the case where the upper magnetic pole 64a is prepared in a dry scheme, the second stage of thin-film coil 66 is formed, and the upper magnetic layer 64, which is the rear end part of the magnetic pole, is made so as to form a core. Then, trimming is carried out for further narrowing the upper magnetic pole 64a, while the recording gap layer 62 and the upper part of lower magnetic layer 61 are selectively etched at the same time, so as to form an overcoat layer 21 made of an insulating material such as $Al_2O_3$ as shown in FIG. 22. The foregoing is a process of making the upper magnetic pole 64a utilizing a plating scheme.

Though both of the foregoing cases based on dry and plating schemes relate to an example in which the leading end part of the upper magnetic pole is formed separately from the rear end part of the upper magnetic pole, the forming of the upper magnetic pole in accordance with the present invention is not restricted thereto, whereby the leading and rear end parts of magnetic poles may be formed at the same time. In the latter case, it will be sufficient if an upper magnetic layer functioning as the leading and rear end parts of upper magnetic poles are formed by using the present invention by way of predetermined steps after the thin-film coils 66 and photoresist layer 67 are formed.

Figure 25A:
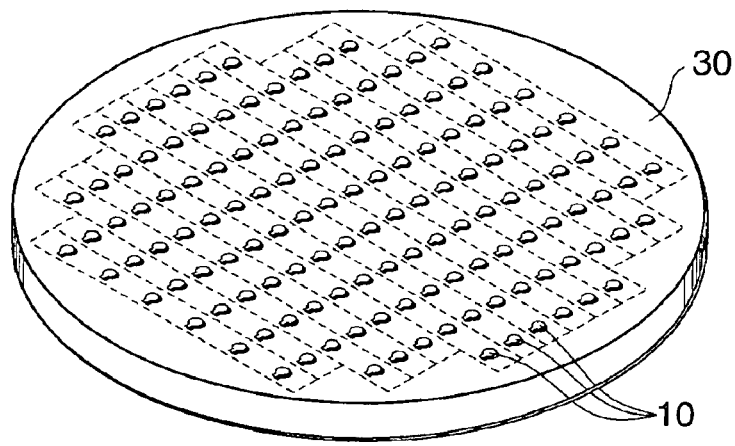
FIG. 25A is a perspective view showing a substrate formed with a plurality of thin-film magnetic heads 10.
Figure 25B:
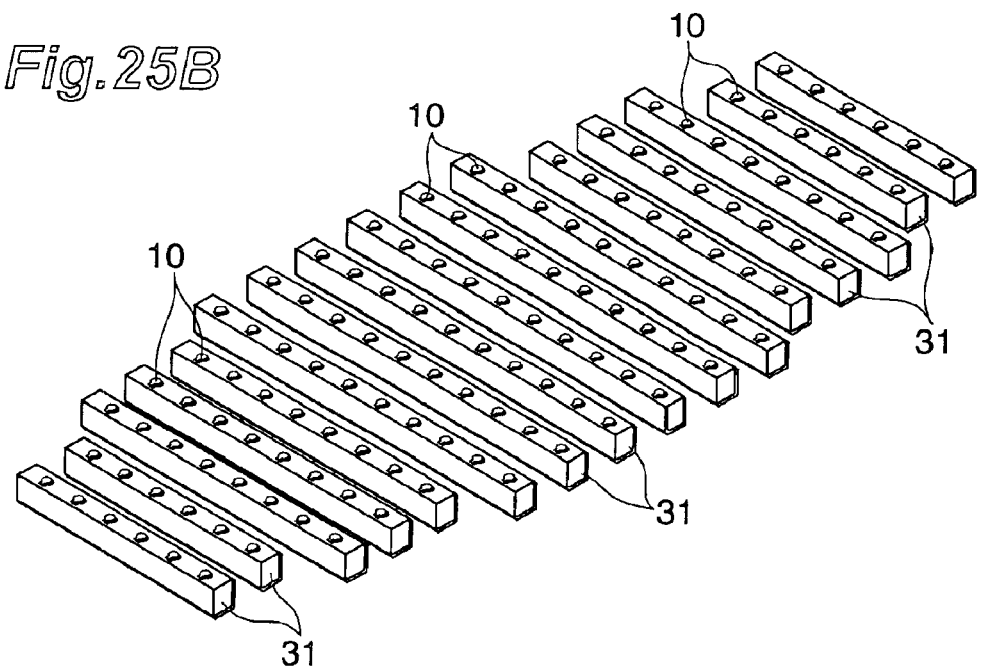
FIG. 25B is a perspective view showing bars obtained by cutting the substrate.

The foregoing accomplishes the part corresponding to the recording head section 60 of the thin-film magnetic head 10. Since this stage is in a state where a plurality of thin-film magnetic heads 10 are formed on the substrate 30 as shown in FIG. 25A, the substrate 30 is initially cut so as to yield a plurality of bars 31 as shown in FIG. 25B. The magneto resistive device assembly in this specification refers to both of a substrate formed with a plurality of thin-film magnetic heads 10 as shown in FIG. 25A and a bar cut from the substrate as shown in FIG. 25B, and is a concept encompassing all of the products each mounted with a plurality of thin-film magnetic heads 10 cut from the bar 31, for example.

Figure 26:
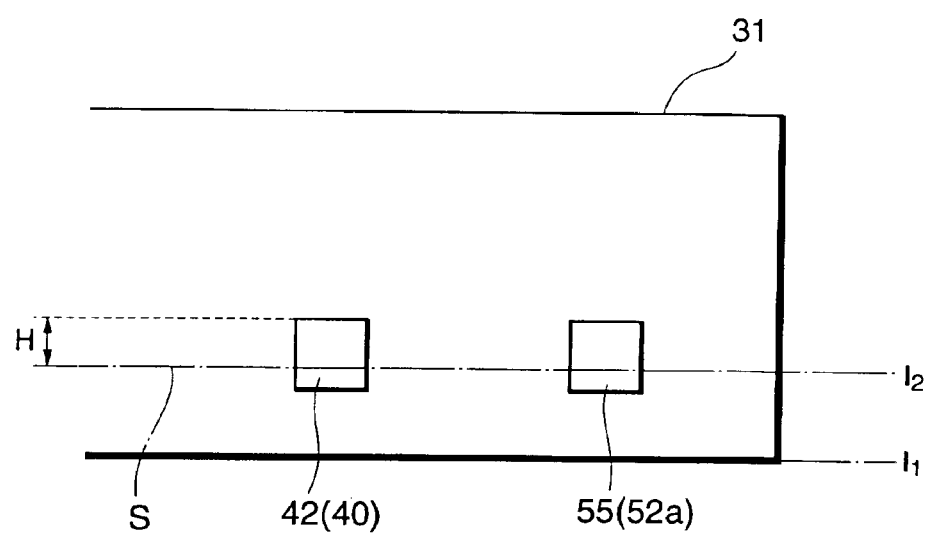
FIG. 26 is a view showing a lapping process for adjusting the MR height.
Figure 27:
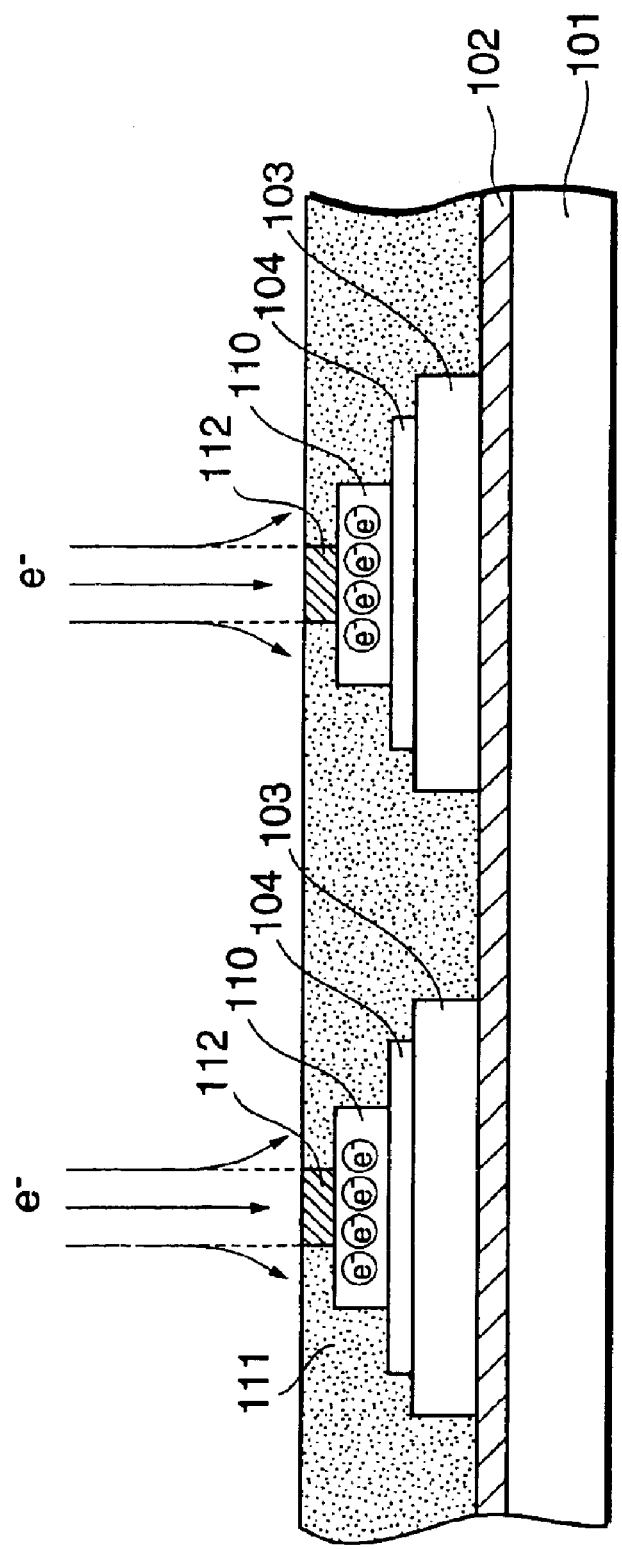
FIG. 27 is a view for explaining reasons why the rectilinearity of electron beams deteriorates, as the inventors found in the process of accomplishing the present invention.

Subsequently, as shown in FIG. 26, lapping (grinding) for adjusting the MR height is carried out as shown in FIG. 26 at the stage where such a bar 31 is prepared. This drawing schematically shows only the TMR film 42 on the bar 31 and the processing monitor device 55 shown in FIG. 16 (as seen from above the bar 31 in FIG. 25B). Lapping is carried out from dash-single-dot line $l_1$ to dash-single-dot line $l_2$, and is terminated at the time when the distance H from the lapping surface to the rear end part of the TMR film 42 attains a predetermined MR height. The distance H can be determined according to the ohmic value of the processing monitor device 55 by measuring the resistance thereof.

After the lapping is completed, the bar 31 is cut into blocks each having a thin-film magnetic head 10. Then, a slider rail is formed by ion milling or the like, so as to yield the slider 11 shown in FIG. 2. Further, this slider 11 is mounted on the gimbals 12 and then is connected to the suspension arm 13, whereby the head gimbal assembly 15 shown in FIG. 1 is accomplished. The head gimbal assembly 15 made by way of the foregoing process exhibits a very high magnetic information reproducing performance, since tracks of the TMR film 42 are formed at desirable locations by electron beam lithography while a narrow track width is formed with a high dimensional precision.

After the head gimbal assembly 15 is prepared, it is mounted such that the slider 11 is movable above the hard disk 2 while magnetic signals can be recorded and reproduced, whereby the hard disk apparatus 1 shown in FIG. 1 is accomplished. The hard disk apparatus 1 made by way of the foregoing process can realize a high surface recording density, since tracks of the TMR film 42 are formed at desirable locations by electron beam lithography while a narrow track width is formed with a high dimensional precision.

Though the invention achieved by the inventors is specifically explained with reference to the embodiments in the foregoing, the present invention is not limited to the above-mentioned embodiments. For example, electron beam writing with a high precision can be realized as in the above-mentioned embodiments when the MR device utilizing the magnetoresistive film is an AMR device utilizing an AMR film, a GMR device utilizing a GMR film, or the like instead of the TMR device.

As explained in the foregoing, the present invention can realize electron beam lithography with high writing positional precision and dimensional precision.

The basic Japanese Application No. 2002-14722 filed on Jan. 23, 2002 is hereby incorporated by reference.

What is claimed is:

1. A method of making a thin-film magnetic head having a magnetoresistive device, said method comprising, at least, the steps of:

forming, on a substrate to be formed with a plurality of magnetoresistive devices at respective forming positions, a magnetoresistive film so as to connect said plurality of forming positions to each other electrically;

coating one side of said magnetoresistive film with an electron beam resist;

forming a resist film having a desirable pattern by irradiating said electron beam resist with an electron beam after bringing an electrically conductive member into contact with said magnetoresistive film; and forming said magnetoresistive film into a desirable pattern by using said resist film as a mask;

so as to prepare a plurality of magnetoresistive devices on said substrate; and then cutting said substrate into a plurality of thin-film magnetic heads.

2. A method of making a thin-film magnetic head according to claim 1, wherein, in said step of forming a resist film having a desirable pattern, said electron beam resist is irradiated with an electron beam while said electrically conductive member is in contact with said magnetoresistive film.

3. A method of making a thin-film magnetic head according to claim 1, wherein, in said step of forming a magnetoresistive film, said magnetoresistive film is formed so as to cover substantially the whole surface of said substrate.

4. A method of making a thin-film magnetic head according to claim 1, wherein predetermined sections of said electron beam resist are successively irradiated with said electron beam;

each of said sections being irradiated with said electron beam while said electrically conductive member is in contact with said magnetoresistive film.

5. A method of making a magnetoresistive device assembly equipped with a plurality of magnetoresistive devices, said method comprising the steps of:

forming, on a substrate to be formed with a plurality of magnetoresistive devices at respective forming positions, a magnetoresistive film so as to connect said plurality of forming positions to each other electrically;

coating one side of said magnetoresistive film with an electron beam resist;

forming a resist film having a desirable pattern by irradiating said electron beam resist with an electron beam after bringing an electrically conductive member into contact with said magnetoresistive film; and forming said magnetoresistive film into a desirable pattern by using said resist film as a mask.

6. A method of making a magnetoresistive device assembly according to claim 5, wherein, in said step of forming a resist film having a desirable pattern, said electron beam resist is irradiated with an electron beam while said electrically conductive member is in contact with said magnetoresistive film.

7. A method of making a magnetoresistive device assembly according to claim 5, wherein, in said step of forming a magnetoresistive film, said magnetoresistive film is formed so as to cover substantially the whole surface of said substrate.

8. A method of making a head slider equipped with a thin-film magnetic head having a magnetoresistive device, said method comprising, at least, the steps of:

forming, on a substrate to be formed with a plurality of magnetoresistive devices at respective forming positions, a magnetoresistive film so as to connect said plurality of forming positions to each other electrically;

coating one side of said magnetoresistive film with an electron beam resist;

forming a resist film having a desirable pattern by irradiating said electron beam resist with an electron beam after bringing an electrically conductive member into contact with said magnetoresistive film; and forming said magnetoresistive film into a desirable pattern by using said resist film as a mask;

so as to prepare a plurality of magnetoresistive devices on said substrate; and then cutting said substrate so as to form said head slider.

9. A method of making a head slider according to claim 8, wherein, in said step of forming a resist film having a desirable pattern, said electron beam resist is irradiated with an electron beam while said electrically conductive member is in contact with said magnetoresistive film.

10. A method of making a head gimbal assembly equipped with a thin-film magnetic head having a magnetoresistive device, said method comprising, at least, the steps of:

forming, on a substrate to be formed with a plurality of magnetoresistive devices at respective forming positions, a magnetoresistive film so as to connect said plurality of forming positions to each other electrically;

coating one side of said magnetoresistive film with an electron beam resist;

forming a resist film having a desirable pattern by irradiating said electron beam resist with an electron beam after bringing an electrically conductive member into contact with said magnetoresistive film; and forming said magnetoresistive film into a desirable pattern by using said resist film as a mask;

so as to prepare a plurality of magnetoresistive devices on said substrate; and the steps of:

cutting said substrate so as to yield a plurality of magnetic head sliders each having a thin-film magnetic head; and mounting said magnetic head sliders with gimbals.

11. A method of making a head gimbal assembly according to claim 10, wherein, in said step of forming a resist film having a desirable pattern, said electron beam resist is irradiated with an electron beam while said electrically conductive member is in contact with said magnetoresistive film.

12. A method of making a hard disk apparatus equipped with a thin-film magnetic head having a magnetoresistive device, said method comprising, at least, the steps of:

forming the thin-film magnetic head according to claim 1, wherein said substrate is cut so as to yield a plurality of magnetic head sliders each having a thin-film magnetic head;

mounting said magnetic head sliders with gimbals so as to prepare a head gimbal assembly; and assembling said hard disk apparatus such that said magnetic head slider of said head gimbal assembly is movable above a hard disk adapted to record a magnetic signal.

13. A method of making a thin-film magnetic head having a magnetoresistive device, said method comprising the steps of:

forming a plurality of magnetoresistive devices on a substrate; and forming a plurality of processing monitor devices having an ohmic value related to an MR height of said magnetoresistive devices;

said step of forming processing monitor devices including substeps of:

forming a resistive film to become said processing monitor devices so as to electrically connect said plurality of forming positions to be formed with said processing monitor devices;

coating one side of said magnetoresistive film with an electron beam resist;

forming a resist film having a desirable pattern by irradiating said electron beam resist with an electron beam after bringing an electrically conductive member into contact with said resistive film; and forming said processing monitor devices by turning said resistive film into a desirable pattern while using said resist film as a mask.

14. A method of making a thin-film magnetic head according to claim 13, wherein, in said step of forming a resist film having a desirable pattern, said electron beam resist is irradiated with an electron beam while said electrically conductive member is in contact with said resistive film.

15. A method of making a thin-film magnetic head having an inductive magnetic converting device for recording, said method comprising the steps of:

forming on a substrate a plurality of first magnetic poles and second magnetic poles magnetically connected to said first magnetic poles while holding at least a recording gap layer between said first and second magnetic poles;

said step of forming second magnetic poles including the substeps of:

forming a magnetic film to become said second magnetic poles so as to electrically connect a plurality of forming positions to be formed with said second magnetic poles;

coating one side of said magnetoresistive film with an electron beam resist;

forming a resist film having a desirable pattern by irradiating said electron beam resist with an electron beam after bringing an electrically conductive member into contact with said magnetic film; and forming said magnetic film into said second magnetic poles by using said resist film as a mask.

16. A method of making a thin-film magnetic head according to claim 15, wherein, in said step of forming a resist film having a desirable pattern, said electron beam resist is irradiated with an electron beam while said electrically conductive member is in contact with said magnetic film.

17. A method of making a thin-film magnetic head having an inductive magnetic converting device for recording, said method comprising the steps of:

forming on a substrate a plurality of first magnetic poles and second magnetic poles magnetically connected to said first magnetic poles while holding at least a recording gap layer between said first and second magnetic poles;

said step of forming second magnetic poles including the substeps of:

forming a plating electrode so as to electrically connect a plurality of forming positions to be formed with said second magnetic poles;

coating one side of said plating electrode with an electron beam resist;

forming a resist film having a desirable pattern by irradiating said electron beam resist with an electron beam after bringing an electrically conductive member into contact with said plating electrode; and forming said second magnetic poles having a desirable pattern on said plating electrode by plating while using said resist film as a mask.

18. A method of making a thin-film magnetic head according to claim 17, wherein, in said step of forming a resist film having a desirable pattern, said electron beam resist is irradiated with an electron beam while said electrically conductive member is in contact with said plating electrode.

* * * * *